United States Patent
Kaneko et al.

(10) Patent No.: US 10,815,976 B2
(45) Date of Patent: Oct. 27, 2020

(54) ACTUATOR DEVICE

(71) Applicant: Panasonic Intellectual Property Management Co., Ltd., Osaka (JP)

(72) Inventors: Yuriko Kaneko, Nara (JP); Maki Hiraoka, Nara (JP); Naoki Hayashi, Kyoto (JP); Kenji Tagashira, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/547,569

(22) Filed: Aug. 22, 2019

(65) Prior Publication Data

US 2019/0376495 A1    Dec. 12, 2019

Related U.S. Application Data

(63) Continuation of application No. PCT/JP2018/036207, filed on Sep. 28, 2018.

(30) Foreign Application Priority Data

Nov. 27, 2017    (JP) .................................. 2017-226836

(51) Int. Cl.
    *F03G 7/06*         (2006.01)
(52) U.S. Cl.
    CPC .................................... *F03G 7/065* (2013.01)
(58) Field of Classification Search
    CPC ............ F03G 7/06; F03G 7/065; H02N 10/00
    (Continued)

(56) References Cited

U.S. PATENT DOCUMENTS

| 4,733,603 A | 3/1988 | Kukolj |
| 7,025,797 B2 * | 4/2006 | Zettel .................. B01D 25/001 55/282.3 |

(Continued)

FOREIGN PATENT DOCUMENTS

| CA | 3018747 A1 * | 9/2017 | ............... D02G 3/26 |
| JP | 2015-059276 | 3/2015 | |

(Continued)

OTHER PUBLICATIONS

International Search Report of PCT application No. PCT/JP2018/036207 dated Nov. 27, 2018.

(Continued)

*Primary Examiner* — Mark A Laurenzi
*Assistant Examiner* — Mickey H France
(74) *Attorney, Agent, or Firm* — McDermott Will & Emery LLP

(57) ABSTRACT

An actuator device comprises an actuator wire, a net-shaped heating element which covers a side surface of the actuator wire and comprises heating wires, and a controller for supplying electric power to the net-shaped heating element to heat the net-shaped heating element. The actuator wire is contracted by application of heat and restored by release of the heat. The side surface of the actuator wire is formed of a polymer. One end of the net-shaped heating element is connected to an end of the actuator wire. Another end of the net-shaped heating element is connected to another end of the actuator wire. Each of the heating wires comprises an insulative first elastic yarn and a metal wire. The metal wire are helically wound onto the first elastic yarn. When the net-shaped heating element is not heated, the net-shaped heating element is in contact with the side surface of the actuator wire. When the net-shaped heating element is heated, the net-shaped heating element moves outward from (Continued)

the side surface of the actuator wire due to contraction of the actuator wire.

22 Claims, 17 Drawing Sheets

(58) Field of Classification Search
USPC .......................... 60/527–529; 310/306, 307
See application file for complete search history.

(56) References Cited

U.S. PATENT DOCUMENTS

| | | | |
|---|---|---|---|
| 10,154,895 B2 | 12/2018 | Hiraoka et al. | |
| 2007/0207186 A1* | 9/2007 | Scanlon ................... | A61F 2/91 424/424 |
| 2008/0170982 A1* | 7/2008 | Zhang .................... | C01B 32/15 423/447.3 |
| 2009/0114303 A1* | 5/2009 | Kim ...................... | F16L 51/027 138/121 |
| 2015/0073318 A1* | 3/2015 | Holschuh ................ | B64G 6/00 601/84 |
| 2015/0152852 A1* | 6/2015 | Li ............................ | D01F 6/00 60/528 |
| 2015/0369264 A1* | 12/2015 | Felt .......................... | F03G 7/06 92/90 |
| 2016/0326675 A1 | 11/2016 | Kinugasa | |
| 2017/0292502 A1* | 10/2017 | Tonazzini .............. | B22D 30/00 |
| 2017/0304136 A1* | 10/2017 | Holschuh ............... | A61H 1/008 |
| 2017/0306934 A1* | 10/2017 | Ahn ........................ | F03G 7/065 |
| 2018/0163707 A1* | 6/2018 | Kaneko ................... | F03G 7/06 |
| 2018/0266400 A1* | 9/2018 | Gurley .................... | F03G 7/065 |
| 2019/0267916 A1* | 8/2019 | Watanabe .............. | H02N 11/00 |
| 2019/0376495 A1* | 12/2019 | Kaneko .................. | F03G 7/065 |

FOREIGN PATENT DOCUMENTS

| | | | |
|---|---|---|---|
| JP | 2016-211104 | 12/2016 | |
| JP | 6111438 B | 4/2017 | |
| WO | WO-2005027333 A1 * | 3/2005 | ............. F03G 7/005 |
| WO | 2014/022667 | 2/2014 | |

OTHER PUBLICATIONS

Maki Hiraoka et al., "Power-efficient low-temperature woven coiled fibre actuator for wearable applications", Scientific Reports, vol. 6, Article No. 36358, Nov. 4, 2016.

* cited by examiner

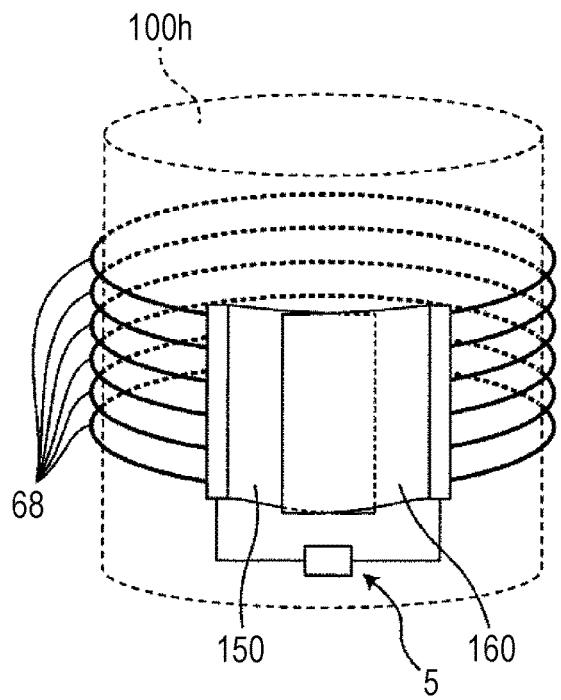
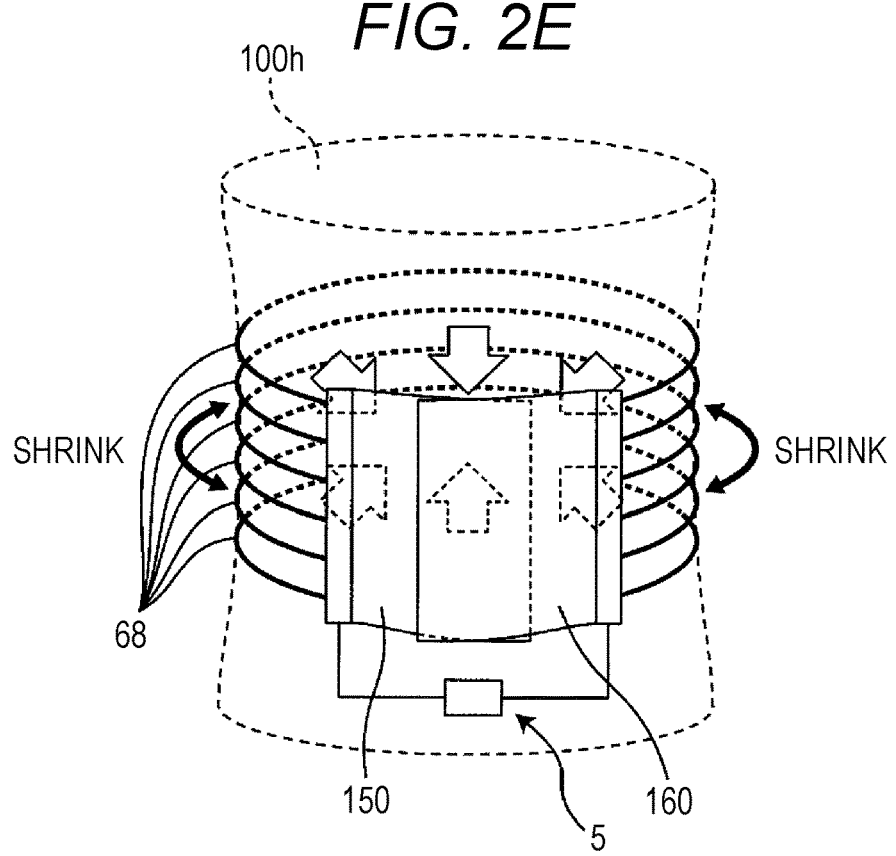

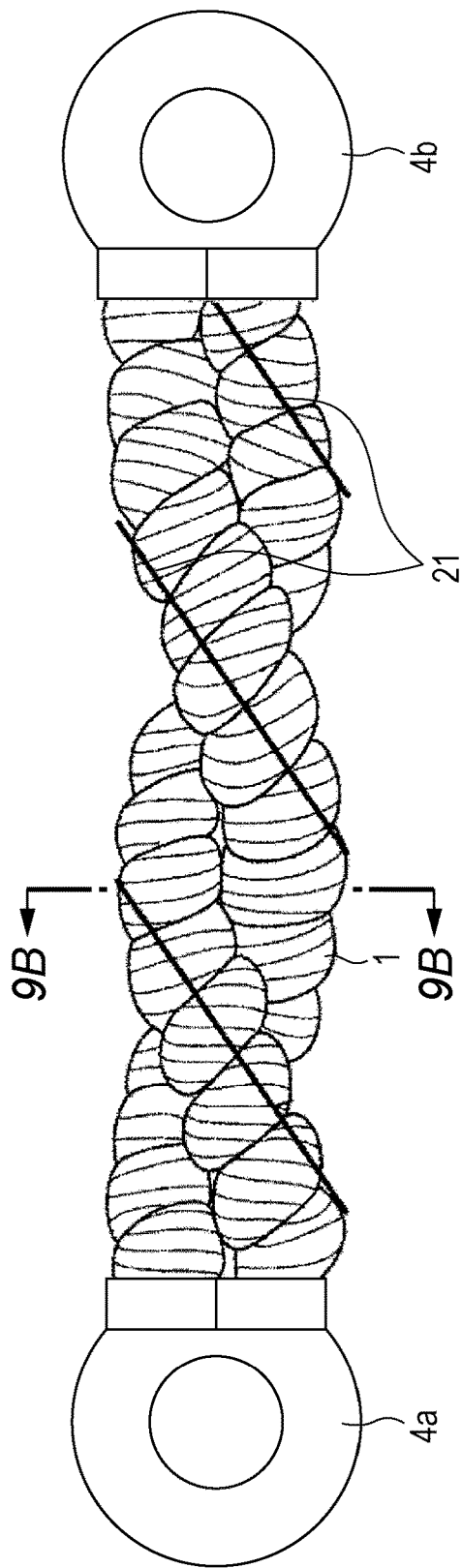
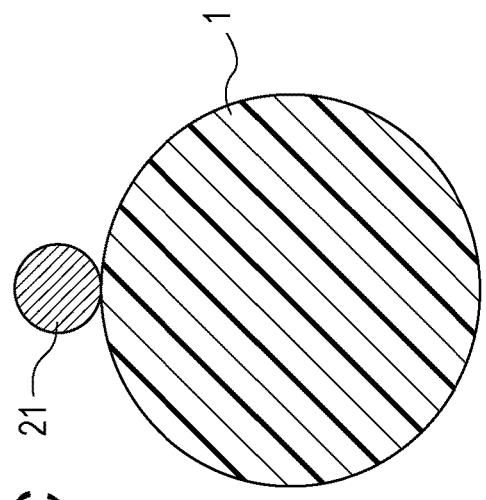
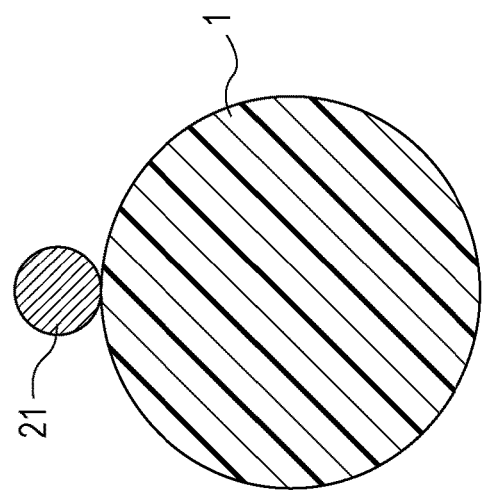

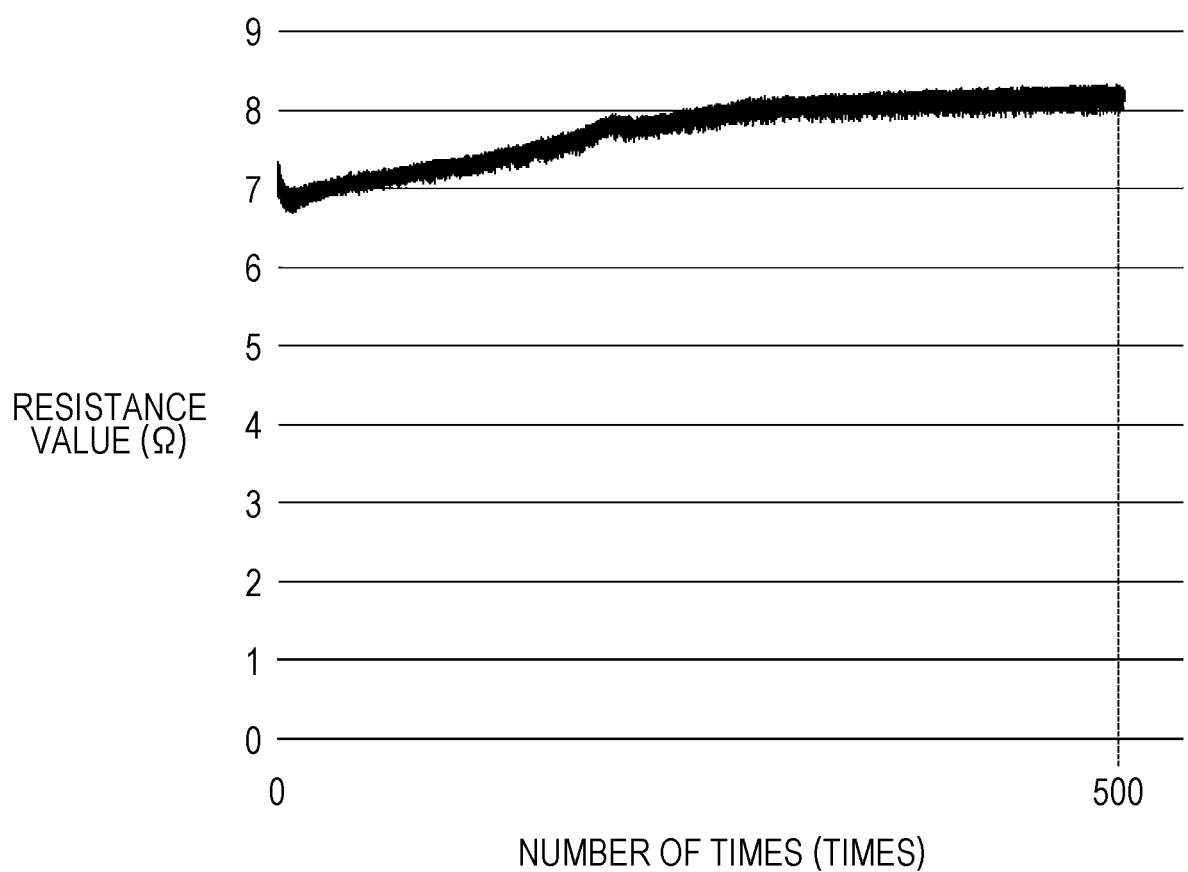

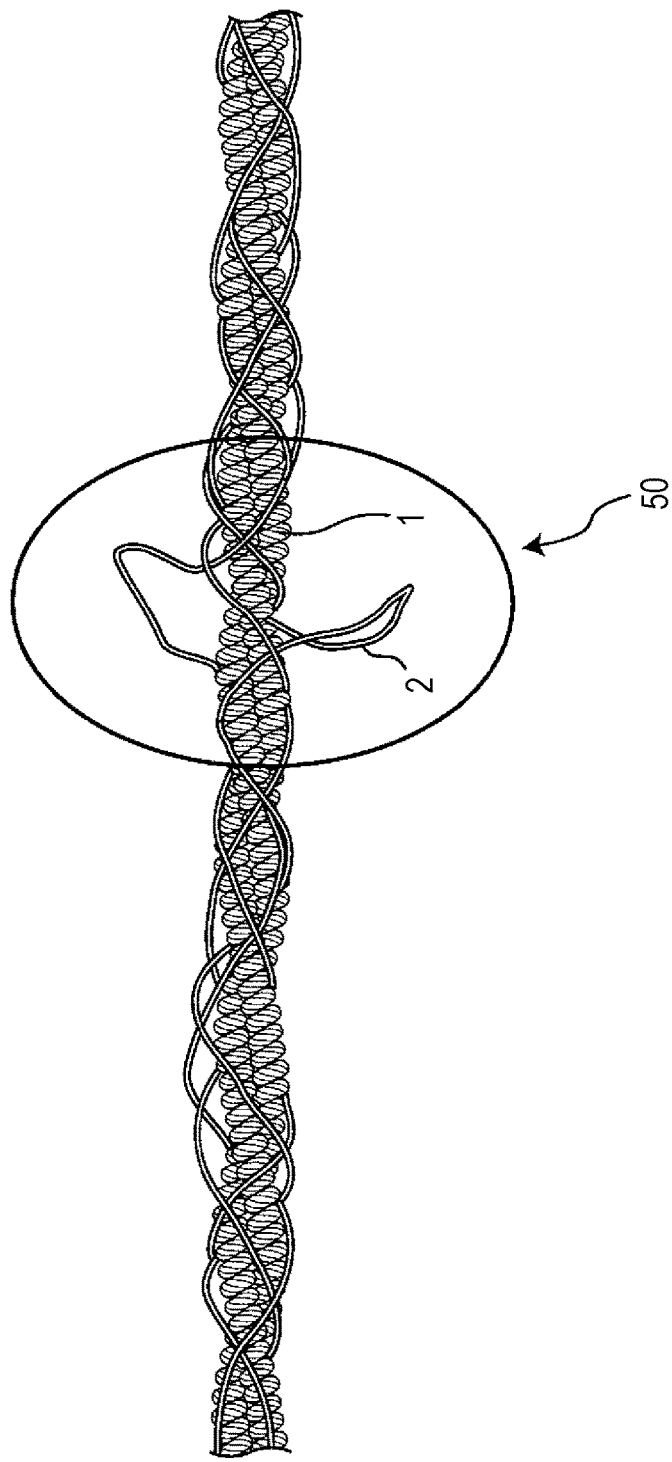
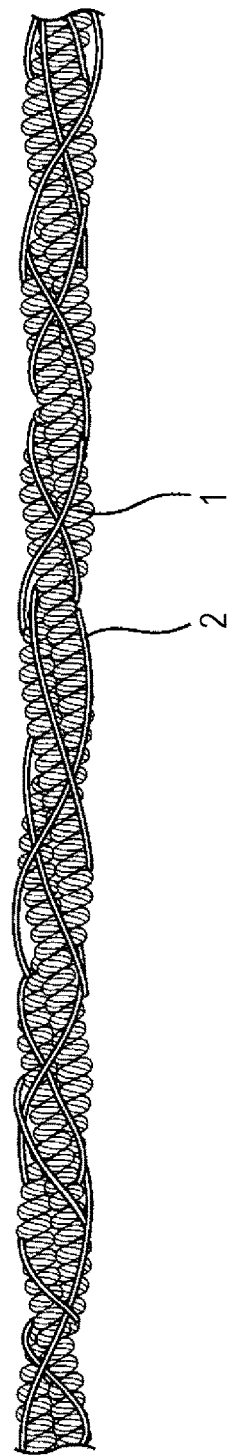

ACTUATOR DEVICE

TECHNICAL FIELD

The present disclosure relates to an actuator device.

BACKGROUND

Patent Literature 1 discloses a coiled and non-coiled twisted nanofiber yarn and polymer fiber torsional and tensile actuators. Maki Hiraoka et. al. have disclosed, in Non-Patent Literature 1, a coil-shaped polymer fiber formed of linear low-density polyethylene. According to Non-Patent Literature 1, the coil-shaped polymer fiber is contracted by application of heat and is restored by release of heat. Non-Patent Literature 1 discloses a heating wire helically wound on the coil-shaped polymer fiber. The heating wire is used to heat the coil-shaped polymer fiber. Patent Literature 2 discloses an actuator is capable of being contracted in an axial direction thereof.

CITATION LIST

Patent Literature 1: WO 2014/022667
Patent Literature 2: U.S. Pat. No. 4,733,603
Patent Literature 3: Japanese Patent Application Publication No. 2016-211104
Patent Literature 4: Japanese Patent Application Publication No. 2015-059276
Patent Literature 5: Japanese Patent Publication No. 6111438
Non-Patent Literature 1: Maki Hiraoka et. al. "Power-efficient low-temperature woven coiled fibre actuator for wearable applications" Scientific Reports volume 6, Article number: 36358 (2016)

SUMMARY

Technical Problem

An object of the present disclosure is to provide an actuator device in which an electric resistance value of a net-shaped heating element is not substantially changed even when application of heat and release of the heat are repeated.

Solution to Problem

The actuator device according to the present disclosure comprises:
 an actuator wire;
 a net-shaped heating element which covers a side surface of the actuator wire and comprises heating wires; and
 a controller for supplying electric power to the net-shaped heating element to heat the net-shaped heating element,
  wherein
  the actuator wire is contracted by application of heat and restored by release of the heat;
  the side surface of the actuator wire is formed of a polymer;
  one end of the net-shaped heating element is connected to an end of the actuator wire;
  another end of the net-shaped heating element is connected to another end of the actuator wire,
  each of the heating wires comprises an insulative first elastic yarn and a metal wire;
  the metal wire are helically wound onto the first elastic yarn;
  when the net-shaped heating element is not heated, the net-shaped heating element is in contact with the side surface of the actuator wire; and
  when the net-shaped heating element is heated, the net-shaped heating element moves outward from the side surface of the actuator wire due to contraction of the actuator wire.

Effect of Invention

Each of the heating wires comprises the first elastic yarn and the metal wire. The first elastic yarn is insulative. Accordingly, an electric resistance value of the heating wire depends mainly on an electric resistance value of the metal wire. The metal wires would be less likely to be broken or worn with extension and contraction of the actuator wire. Thus, even when the actuator wire repeatedly is extended and contracted, the electric resistance value of the heating wires is not changed substantially. Accordingly, an electric resistance value of the net-shaped heating element comprising a plurality of the heating wires is also not changed substantially. In this way, when the net-shaped heating element is heated, its heating value is kept almost constant. As a result, an amount of the extension and contraction of the actuator wire is maintained constant.

The present disclosure provides an actuator device in which the electric resistance value of the net-shaped heating element is not changed substantially even when application of heat and release of the heat are repeated.

BRIEF DESCRIPTION OF DRAWINGS

FIG. 2D is a schematic diagram of a state where actuator device 60 including a plurality of actuators 68 has been attached to thigh 100h before heating.

FIG. 2E is a schematic diagram of a state where actuator device 60 including the plurality of actuators 68 has been attached to thigh 100h after heating.

FIG. 9A is a schematic diagram of an actuator used in Comparative Example 1.

FIG. 9B is a cross-sectional view taken along line 9B-9B included in FIG. 9A.

FIG. 9C is a cross-sectional view when a current flows through a heating wire.

FIG. 10C is a diagram illustrating changes in electric resistance value of a net-shaped heating element according to Comparative Example 2.

FIG. 11A is a schematic diagram of a state where an actuator according to Comparative Example 3 has been contracted.

FIG. 11B is a schematic diagram of a state where the actuator according to Comparative Example 3 has been extended.

DESCRIPTION OF EMBODIMENT

The present inventors have studied, as a heat source for an actuator formed of coil-shaped polymer fibers disclosed in Non-Patent Literature 1, use of a net-shaped heating element including a plurality of heating wires and covering an outside surface of the coil-shaped polymer fibers.

The present inventors have used stranded silver-plated nylon yarn as heating wires. As illustrated in FIG. 11B, the present inventors have knitted a plurality of heating wires around the outside surface of the coil-shaped polymer fibers to form the net-shaped heating element. When the present inventors have used the net-shaped heating element as a heat source to allow the coil-shaped polymer fibers to be extended and contracted repeatedly, the net-shaped heating element has changed in resistance value. The possible reason therefor is that a difference in thermal expansion coefficient between the plated metal and the nylon yarn has caused the plated metal to peel from nylon yarn.

The present inventors have paid great efforts to study how to suppress a change in electric resistance value of the net-shaped heating element. As a result, the present inventors have reached the aspect described above.

The embodiment of the present disclosure will now be described herein in detail with reference to the drawings.

Figure 1:
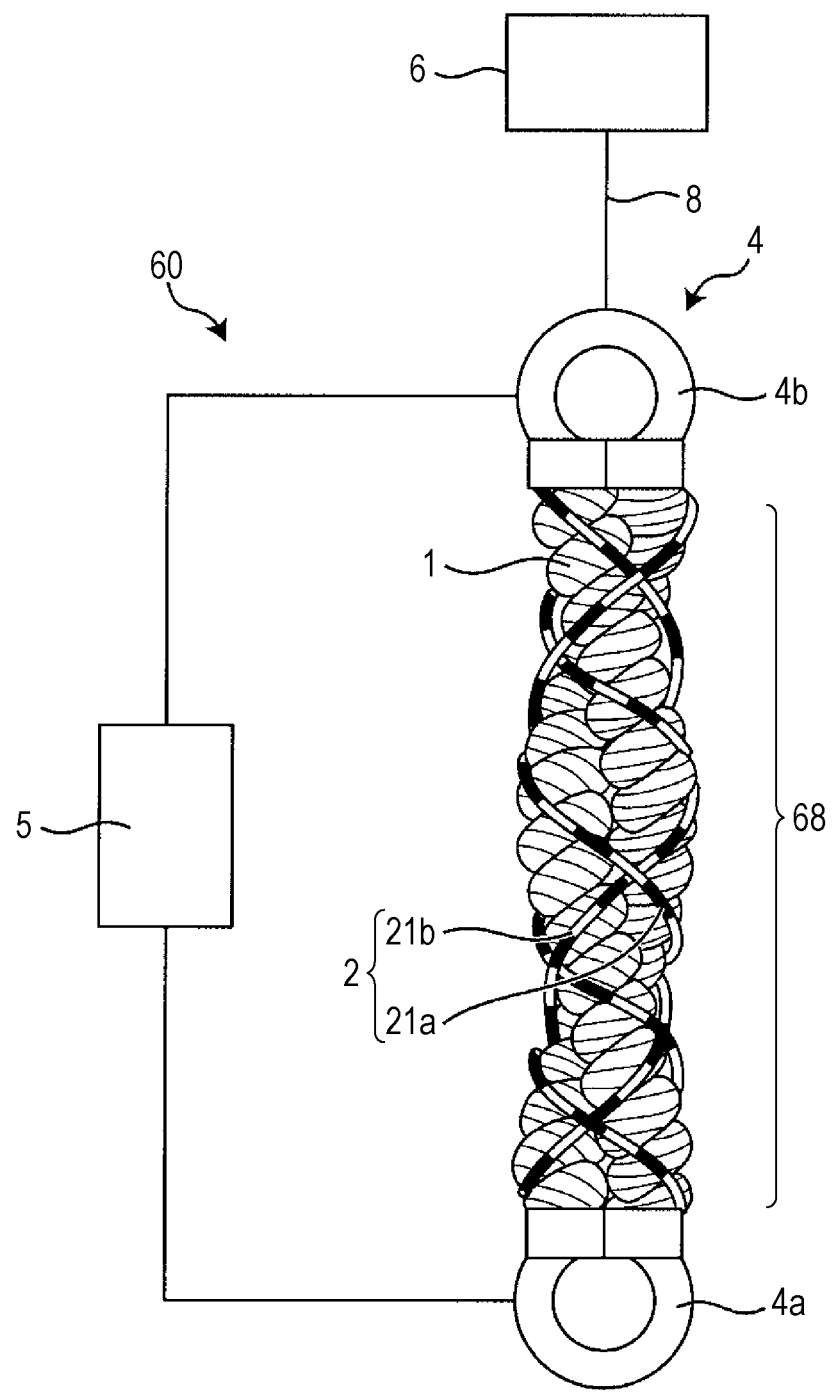
FIG. 1 is a schematic diagram of actuator device 60 according to a first embodiment of the present disclosure.

FIG. 1 is a schematic diagram of actuator device 60 according to the embodiment. Actuator device 60 according to the embodiment includes actuator wire 1, net-shaped heating element 2, and controller 5. Heating element 2 is disposed on an outside surface of actuator wire 1 of actuator device 60. Heating element 2 and controller 5 are electrically coupled to each other. Actuator 68 includes actuator wire 1 and heating element 2.

(Actuator Wire 1)

For details on actuator wire 1, see Patent Literature 5, which is prior to the present patent application. Patent Literature 5 (i.e., Japanese Patent No. 6111438), as well as U.S. patent Publication Ser. No. 15/245,145, Chinese Patent Publication No. 201680000857.0, and European Patent Publication No. 16767126.2, which correspond to Patent Literature 5, are incorporated herein by reference.

Actuator wire 1 is disclosed in Non-Patent Literature 1. It may be said that the present disclosure relates to an improvement to actuator wire 1 disclosed in Patent Literature 5. The terms "actuator wire" and "heating element" used in the present specification respectively correspond to the terms "fiber" and "temperature regulator" used in Patent Literature 5.

As disclosed in Patent Literature 5, actuator wire 1 may be composed of a coil-shaped polymer fiber formed of linear low-density polyethylene. Actuator wire 1 is contracted by application of heat and is restored by release of the heat. As an example, when actuator wire 1 having one end to which a load of 10 MPa is applied is heated to 90 degrees Celsius, actuator wire 1 is contracted approximately 23%. When actuator wire 1 is cooled to a room temperature, actuator wire 1 is restored so as to have its original length. As also disclosed in Patent Literature 5, actuator wire 1 may be heated to a temperature, for example, of not less than 30 degrees Celsius and not more than 100 degrees Celsius. A material of the coil-shaped polymer fiber is not limited to linear low-density polyethylene. For example, polyethylene (e.g., low-density polyethylene or high-density polyethylene), nylon (e.g., nylon6, nylon6,6, nylon12), polyester, or elastomer (e.g., silicone rubber) may be used.

Figure 2A:
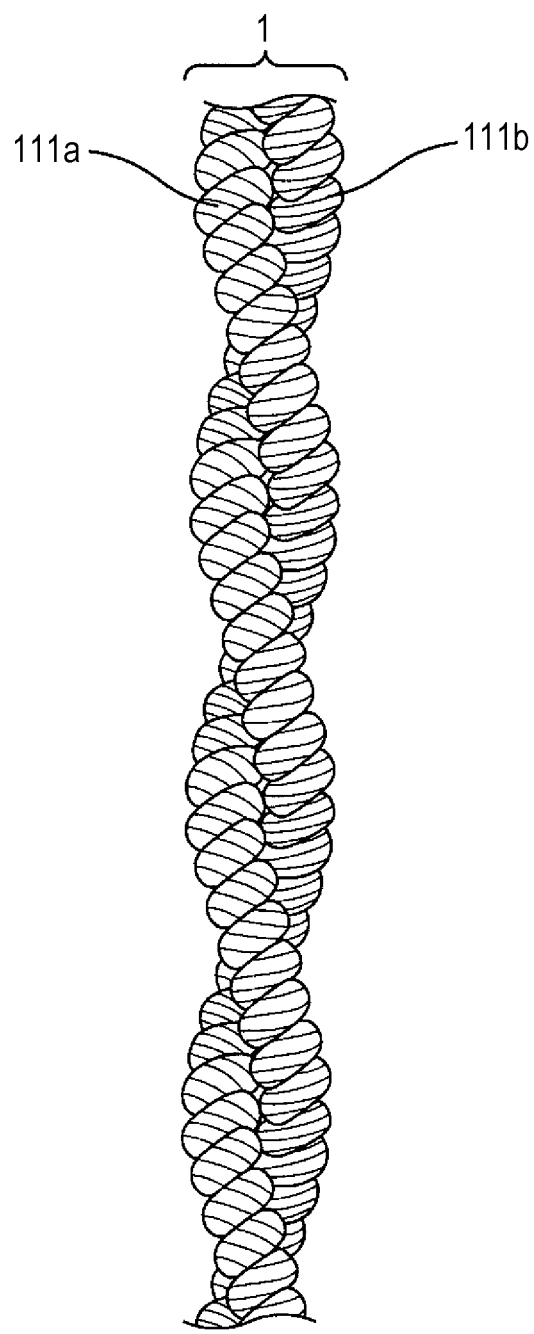
FIG. 2A is a schematic diagram of actuator wire 1 composed of two coil-shaped polymer fibers 111a and 111b, both of which are stranded with each other.

Actuator wire 1 may be composed of one coil-shaped polymer fiber. As illustrated in FIG. 2A, actuator wire 1 may be composed of two or more coil-shaped polymer fibers 111 which have been twisted together. In other words, the actuator wire 1 may be formed by twisting two or more coiled polymer fibers 111 in such a manner that the side surface of one twisted coiled polymer fiber 111a is brought into contact with the side surface of other twisted coiled polymer fiber 111b. In FIG. 2A, the actuator wire 1 is composed of two coiled polymer fibers 111 which have been integrated so as to be twisted together.

(Net-Shaped Heating Element 2)

Net-shaped heating element 2 covers the side surface of actuator wire 1. It is desirable that net-shaped heating element 2 is tubular so as to contain the actuator wire 1. Net-shaped electric heating element 2 is composed of plural electric heating wires 21. As will be described later, net-shaped heating element 2 is formed by braiding, knitting, or weaving electric heating wires 21.

(Heating Wire 21)

Figure 2B:
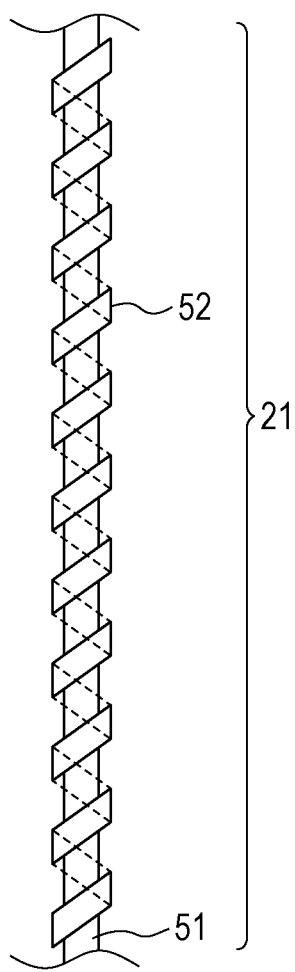
FIG. 2B is a schematic diagram of heating wire 21 according to the first embodiment of the present disclosure.

FIG. 2B is one example of heating wire 21. Heating wire 21 comprises insulative elastic yarn 51 (i.e., core yarn) and metal wire 52 (i.e., sheath yarn). Heating wire 21 illustrated in FIG. 2B is referred to as a "single-covering heating wire". In a single-covering heating wire, sheath yarn is S-twisted or Z-twisted around core yarn. In the example illustrated in FIG. 2B, metal wire 52 is Z-twisted.

An electric resistance value of heating wire 21 mainly depends on an electric resistance value of metal wire 52. Even when actuator wire 1 is extended and contracted, metal wire 52 would be less likely to be broken or worn. Thus, even when actuator wire 1 is repeatedly extended and contracted, the electric resistance value of heating wire 21 does not change substantially. Therefore, even when net-shaped heating element 2 is heated, its heating value is kept almost constant. As a result, an amount of extension and contraction of actuator wire 1 may be kept almost constant. When metal-plated yarn is used in place of metal wire 52, an electric resistance value of a heating wire may change due to the repeated extension and contraction of actuator wire 1. The reason therefor would be that the plated metal is peeled from the yarn due to a difference of thermal expansion coefficient of the plated metal from thermal expansion coefficient of the yarn. In this case, an amount of extension and contraction of actuator wire 1 fails to be kept constant.

In heating wire 21, metal wire 52 is wound on elastic yarn 51. Thus, rigidity of heating wire 21 mainly depends on rigidity of elastic yarn 51. Elastic yarn 51 is yarn, as well as is an elastic body, having low rigidity. Thus, heating wire 21 has low rigidity. Therefore, net-shaped heating element 2 composed of the plurality of heating wires 21 follows contraction of actuator wire 1. When non-elastic yarn is used in place of elastic yarn 51, a heating wire does not have low rigidity. Thus, in this case, a net-shaped heating element fails to follow contraction of actuator wire 1.

As described above, heating wire 21 has two advantages. In other words, the two advantages are an electric resistance value which does not substantially change temporally, and low rigidity.

In addition, heating wire 21 also has an advantage that the number of fabrication steps and the number of members are smaller than those of a double-covering heating wire which will be described later.

As illustrated in FIG. 2B, it is desirable that elastic yarn 51 has a plurality of exposed portions. This is because, when metal wire 52 is wound closely to an extent that elastic yarn 51 has no exposed portion, heating wire 21 fails to be easily wound around actuator wire 1. When elastic yarn 51 having a greater amount of extension and contraction, such as spandex, is used, metal wire 52 may be wound closely to an extent that elastic yarn 51 has no exposed portion. This is because, when heating wire 21 is wound around actuator wire 1, a tensile force is applied to heating wire 21 to form the plurality of the exposed portions.

Figure 2C:
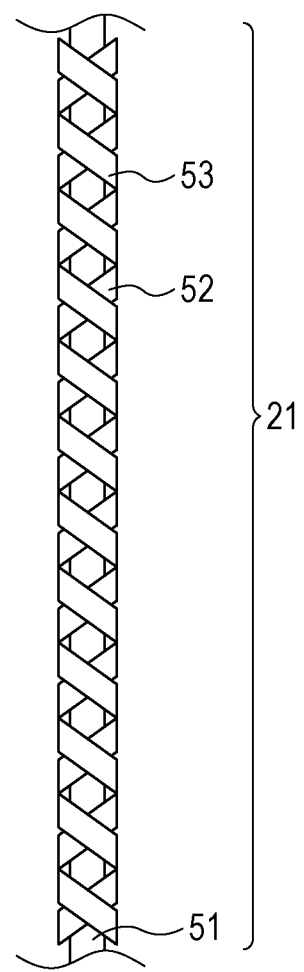
FIG. 2C is a schematic diagram of heating wire 21 according to a variation of the first embodiment of the present disclosure.

FIG. 2C is another example of heating wire 21. Heating wire 21 illustrated in FIG. 2C is referred to as a "double-covering heating wire". A double-covering heating wire has core yarn, first sheath yarn, and second sheath yarn. In the double-covering heating wire, the first sheath yarn is S-twisted around the core yarn, and, further, the second sheath yarn is Z-twisted around which the first sheath yarn has been twisted around the core yarn. Alternatively, the first sheath yarn is Z-twisted around the core yarn, and, further, the second sheath yarn is S-twisted around which the first sheath yarn has been Z-twisted around the core yarn.

As illustrated in FIG. 2C, parts of second elastic yarn 53 cover metal wire 52, whereas other parts of second elastic yarn 53 cover first elastic yarn 51. In other words, in a cross-section vertical to a longitudinal direction of first elastic yarn 51, metal wire 52 is positioned between first elastic yarn 51 and second elastic yarn 53. Second elastic yarn 53 is helically wounded on first elastic yarn 51 on which metal wire 52 has been helically wound.

In a case where a double-covering heating wire comprises first elastic yarn 51 (i.e., core yarn) having an insulating property, metal wire 52 (i.e., first sheath yarn), and second elastic yarn 53 (i.e., second sheath yarn) having an insulating property, metal wire 52 is allowed to be pressed with second elastic yarn 53. Therefore, metal wire 52 is prevented from being moving away from first elastic yarn 51.

In a case where a double-covering heating wire includes first elastic yarn (i.e., core yarn) having an insulating property, second elastic yarn (i.e., first sheath yarn) having an insulating property, and a metal wire (i.e., second sheath yarn), an air space is formed between the core yarn and the first sheath yarn. Thus, a heat-keeping effect is allowed to be provided.

By selecting a kind or a material for elastic yarn, heating wire 21 having different characteristics may be achieved. For example, when spandex is used as elastic yarn, heating wire 21 having a superior elastic property is provided. This is because spandex has significantly high elasticity. If elastic yarn is formed of a material having anisotropy of thermal conductivity, such as extended high density polyethylene, heat would be likely to be released in a certain direction.

Examples of materials of elastic yarn having an insulating property are polyurethane, polyester, polyethylene, and nylon. It is desirable that elastic yarn has a heat-resisting property against a temperature of not more than 100 degrees. A material for a metal wire may be a conductive material such as stainless steel, copper, or gold. It is desirable that a product of tensile strength ($N/mm^2$) and a cross-sectional area ($mm^2$) of one metal wire is more than 0.27 N and less than 0.63 N. The tensile strength used herein means tensile stress when a metal wire is broken. When the product is not less than 0.63 N, since the metal wire has too high rigidity, the metal wire is hardly brought into close contact with the elastic. On the other hand, when the product is not more than 0.27 N, since the metal wire has too low rigidity, the production of heating wire 21 is difficult. Even when the product is not more than 0.27 N, the above-described advantages of heating wire 21 is provided.

Net-shaped heating element 2 may be formed of the plurality of heating wires 21. As illustrated in FIG. 1, it is desirable that the plurality of heating wires 21 intersect with each other so as to have a net shape as a whole.

Net-shaped heating element 2 is formed of any one of braided electric heating wires 21, knitted electric heating wires 21, or waived electric heating wires 21.

Figure 3A:
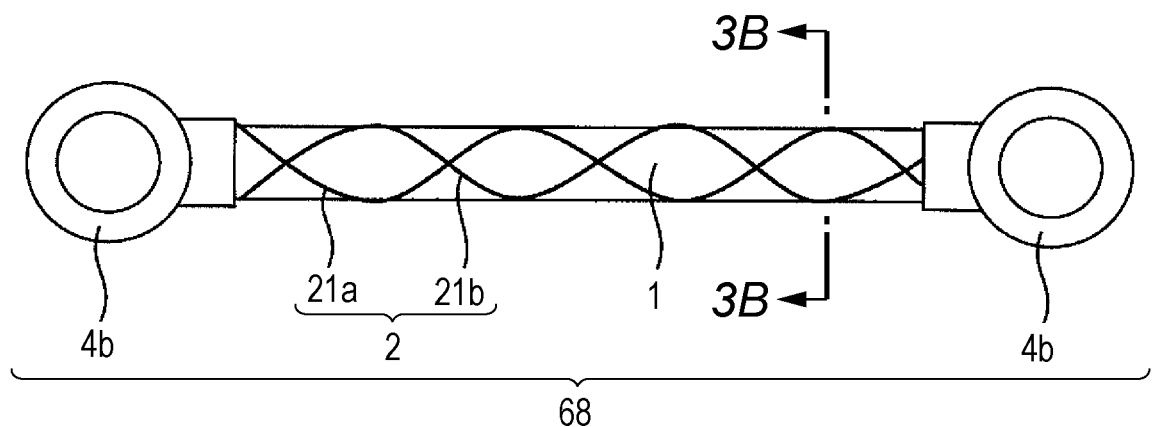
FIG. 3A is a simplified diagram of actuator 68 before heating.

Net-shaped heating element 2 illustrated in FIG. 1 is formed of braided electric heating wires 21. FIG. 3A shows a simple schematic view of actuator 68 comprising net-shaped heating element 2 formed of braided electric heating wires 21. Electric heating wires 21a and 21b are braided so as to wind helically on the side surface of actuator wire 1, and electric heating wires 21a and 21b constitute net-shaped heating element 2 which covers the side surface of actuator wire 1. It is desirable that three or more electric heating wires 21 are braided to constitute net-shaped heating element 2. Each of electric heating wires 21 (namely, 21a, 21b) may have a shape of a coil (namely, a helix). Each of electric heating wires 21 may have a shape of yarn. Each of electric heating wires 21 is S-twisted or Z-twisted.

Figure 3B:
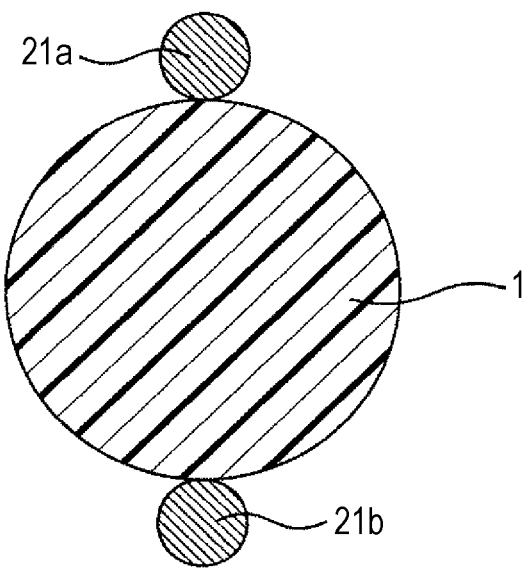
FIG. 3B is a cross-sectional view taken along line 3B-3B included in FIG. 3A.
Figure 3C:
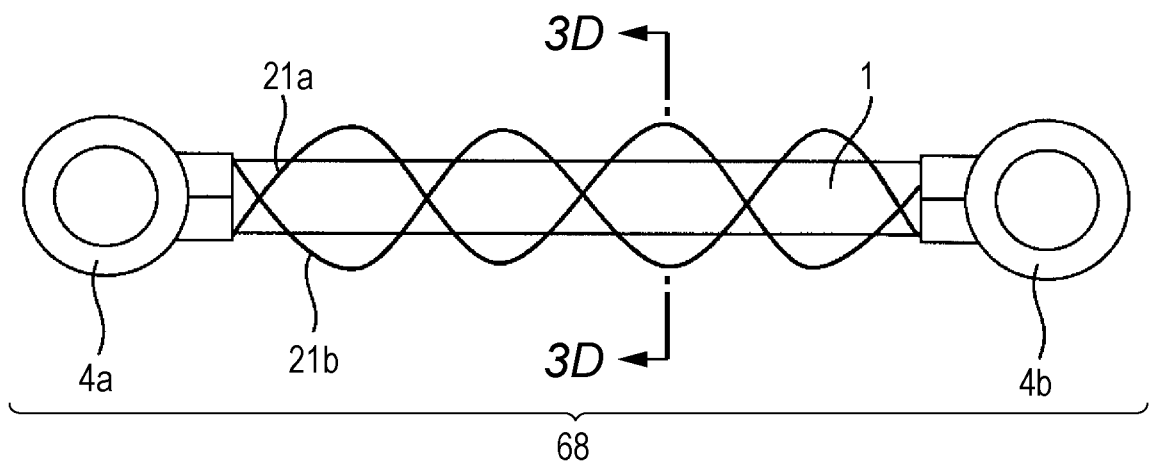
FIG. 3C is a simplified diagram of actuator 68 during heating.
Figure 3D:
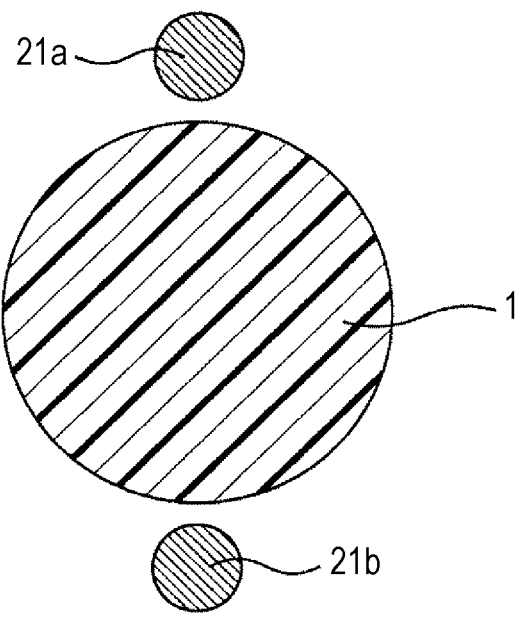
FIG. 3D is a cross-sectional view taken along line 3D-3D included in FIG. 3C.
Figure 3E:
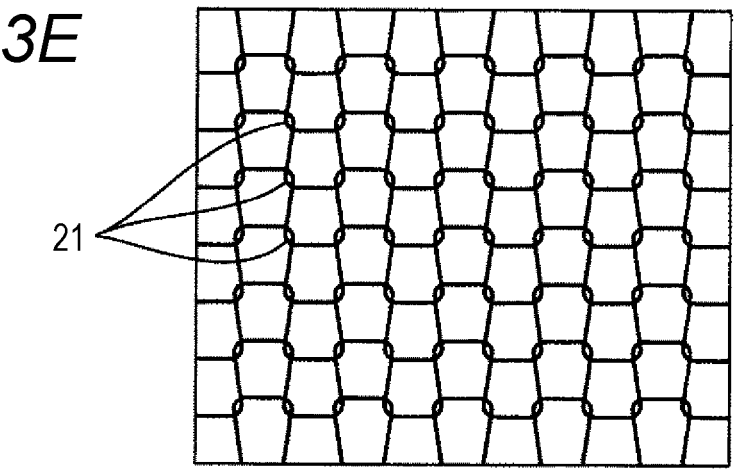
FIG. 3E is a schematic diagram of a plurality of heating wires 21 which have been braided.
Figure 3F:
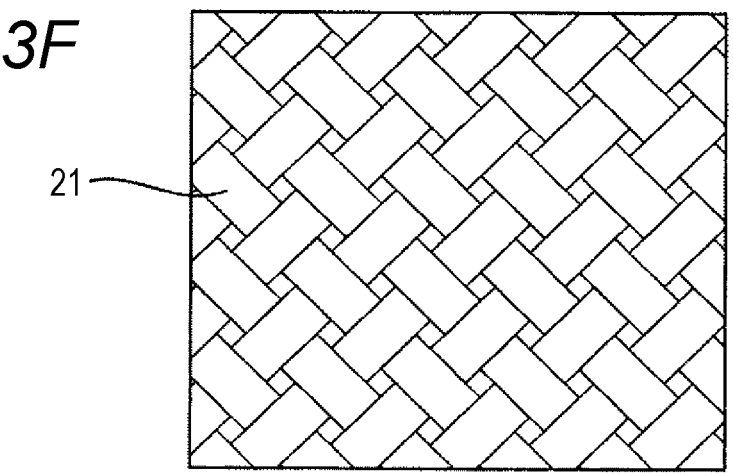
FIG. 3F is a schematic diagram of the plurality of heating wires 21 which have been woven.
Figure 3G:
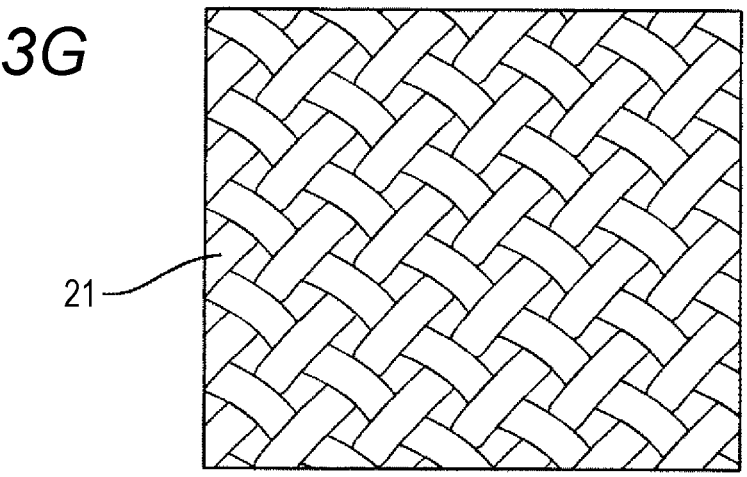
FIG. 3G is a schematic diagram of the plurality of heating wires 21 which have been woven.

FIG. 3E shows a schematic view of the knitted electric heating wires 21. Each of the electric heating wires 21 may have a shape of a rectangular wave. Electric heating wires 21 each having a shape of a rectangular wave are knitted so as to form net-shaped heating element 2. The net-shaped heating element 2 composed of the knitted electric heating wires 21 is wound on the side surface of actuator wire 1. FIG. 3F and FIG. 3G show schematic views of woven electric heating wires 21. Each of electric heating wires 21 may have a shape of a slim plate. Electric heating wires 21a and 21b are woven so as to wind helically on the side surface of actuator wire as each of electric heating wires 21, and electric heating wires 21*a* and 21*b* constitute net-shaped heating element 2 which covers the side surface of actuator wire 1. Woven electric heating wires 21 are divided into first electric heating wires 21*a* and second electric heating wires 21*b*. First electric heating wires 21*a* are parallel to one another. Second electric heating wires 21*b* are also parallel to one another. Each of first electric heating wires 21*a* is in contact with a front surface of one second electric heating wire 21*b* of two adjacent second electric heating wires 21*b* and a back surface of the other second electric heating wire 21*b* of two adjacent second electric heating wires 21*b*. Each of second electric heating wires 21*b* is also in contact with a front surface of one first electric heating wire 21*a* of two adjacent first electric heating wires 21*a* and a back surface of the other first electric heating wire 21*a* of two adjacent first electric heating wires 21*a*.

As will be described later, as long as actuator wire 1 can be contracted and restored repeatedly, namely, as long as net-shaped heating element 2 can follow the repeated contraction and restoration of actuator wire 1, net-shaped heating element 2 may be formed of any one of braided electric heating wires 21, knitted electric heating wires 21, or woven electric heating wires 21.

One end of net-shaped heating element 2 is connected to one end of actuator wire 1. As shown in FIG. 1, as one example, one end of the actuator wire 1 is swaged with connector 4 together with one end of net-shaped heating element 2. In this way, the one end of net-shaped heating element 2 is connected to the one end of actuator wire 1 with first connector 4*a*. Likewise, the other end of net-shaped heating element 2 is connected to the other end of actuator wire 1 with second connector 4*b*. In other words, the other end of actuator 1 is swaged and fixed with the other end of net-shaped heating element 2 using second connector 4*b*. An example of first connector 4*a* and second connector 4*b* is a spade connector. The space connector may be a fork spade connector or a ring spade connector. In FIG. 1, a ring spade connector is illustrated as the first connector 4*a*. As just described, it is desirable that net-shaped heating element 2 is provided between the one end and the other end of actuator wire 1. It is desirable that connector 4 is formed of a metal. The reason therefor will be described.

(Controller 5)

Controller 5 supplies electric power to the net-shaped heating element 2 to heat the net-shaped heating element 2. The controller 5 may comprise an electric power source to supply electric power to net-shaped heating element 2. The electric power supplied to net-shaped heating element 2 may be alternating current or direct current. Controller 5 may comprise a switch. While the switch is turned on, the electric power is supplied to net-shaped heating element 2. On the other hand, while the switch is turned off, the electric power is not supplied to net-shaped heating element 2.

(Fabrication Method of Actuator Device 60)

Hereinafter, the fabrication method of actuator device 60 according to the present disclosure will be described.

First, a well-known covering processor is used. Metal wire 52 is helically wound on elastic yarn 51 to form heating wire 21.

Figure 4:
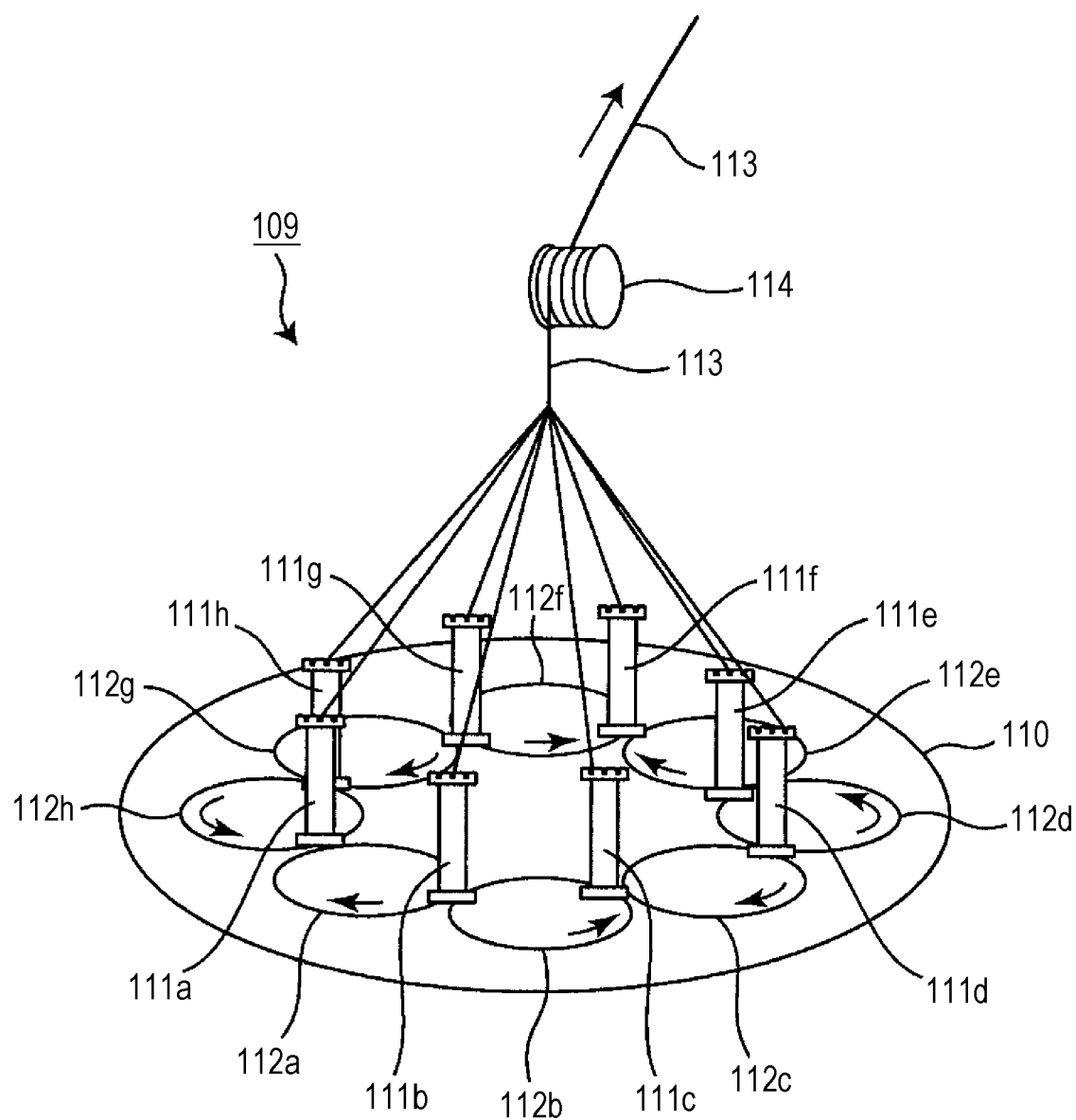
FIG. 4 is a diagram of the braider illustrated in Patent Literature 3.

Next, using a well-known braiding machine, electric heating wires 21 are braided around the side surface of actuator wire 1 to provide actuator 68 comprising actuator wire 1 and net-shaped heating element 2 which covers the side surface of the actuator wire 1. FIG. 4 shows a braiding machine disclosed in Patent Literature 3. In FIG. 4, the referential signs 109, 110, 111*a*-111*h*, 112*a*-112*h*, 113, and 114 indicate a braiding machine, a substrate, bobbins (namely, carriers), circular disks, a braid, and a guide roll, respectively. Patent Literature 4 discloses a braiding machine with which heating wire 21 is wound helically on the side surface of actuator wire 1.

Figure 5:
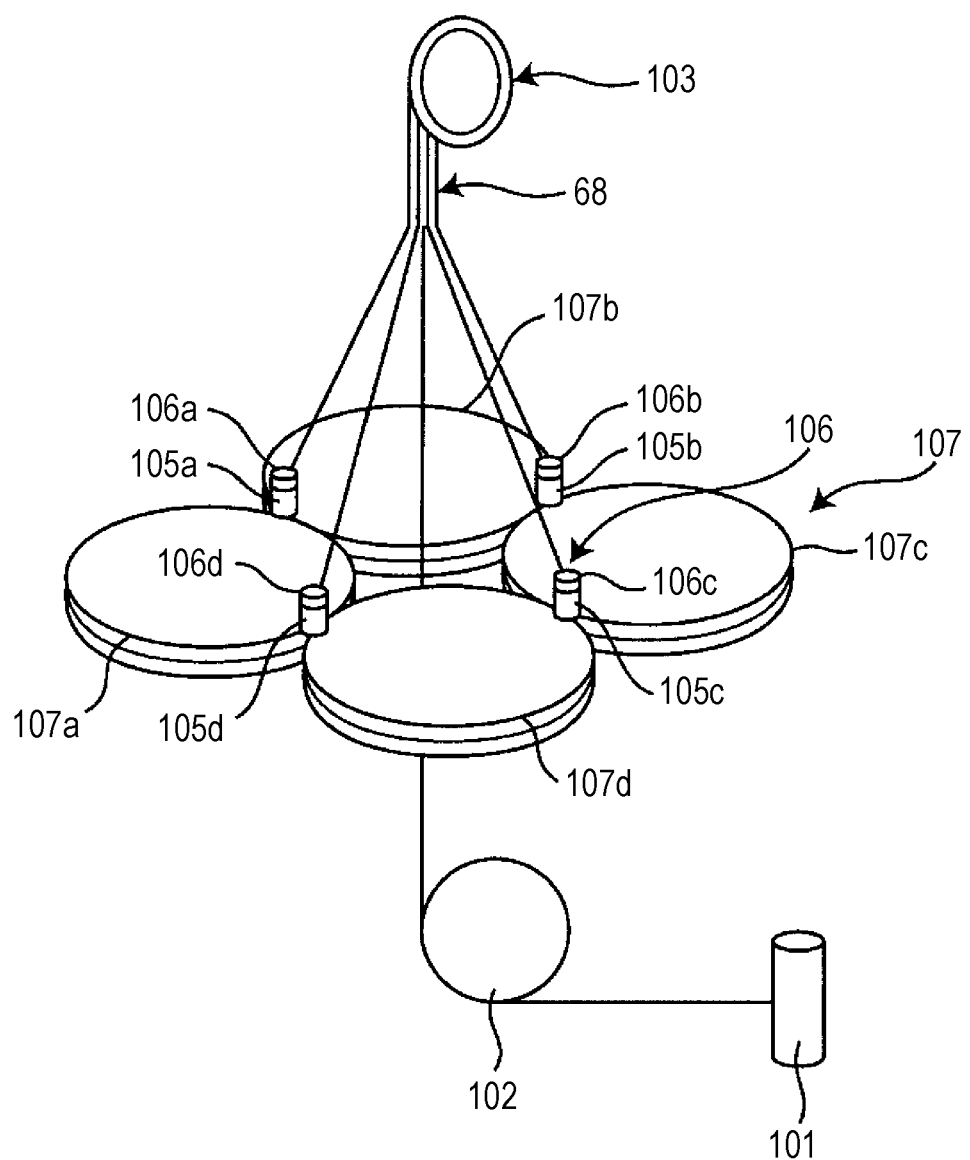
FIG. 5 is a schematic diagram of a braider used to produce actuator 68.

FIG. 5 shows a schematic view of a braiding machine used to produce actuator 68. In FIG. 5, the reference signs 101, 102, 103, 105*a*-105*d*, 106 (106*a*-106*d*), and 107 (107*a*-107*d*) show a bobbin, a pulley, a rolling-up apparatus, bobbins, spindles, and circular disks, respectively. The braiding machine shown in FIG. 5 is constituted by adding the bobbin 101 and the pulley 102 to a well-known braiding machine. Actuator wire 1 is supplied from bobbin 101. Actuator wire 1 is guided with pulley 102. Subsequently, while electric heating wires 21 are supplied through circular disks 107 and spindles 106 onto the side surface of actuator wire 1, actuator wire 1 is rolled up together with electric heating wires 21. In this way, actuator 68 comprising actuator wire 1 and net-shaped heating element 2 which is composed of the electric heating wires 21 covering the side surface of actuator 1 is provided. "Heating wires 21 are 5-twisted" means that that heating wires 21 are S-twisted by the above-described fabrication method. "Heating wires 21 are Z-twisted" means that heating wires 21 are Z-twisted by above-mentioned fabrication method.

Actuator 68 is cut in the desired length. The both ends of actuator 68 cut in the desired length are swaged with first connector 4*a* and second connector 4*b*. In this way, actuator member 68 is provided. Finally, using electric wires, connectors 4 (i.e., first connector 4*a* and second connector 4*b*) are electrically connected to controller 5. In this way, the actuator device 60 according to the present disclosure is provided.

(Operation of Actuator Device 60)

Operation of actuator device 60 will be described below.

As illustrated in FIG. 1, actuator wire 1 is pulled taut, for example, with weight 6. In other words, tension is applied to actuator wire 1 along the longitudinal direction thereof with weight 6.

FIG. 3A is a simplified diagram of actuator 68 when net-shaped heating element 2 is not heated, but a tensile force is applied. FIG. 3B is a cross-sectional view taken along line 3B-3B included in FIG. 3A. As illustrated in FIG. 3A, a mesh of net-shaped heating element 2 follows extension of actuator wire 1 and deforms, without significant move away from the outside surface of actuator wire 1. This is because each of heating wires 21 constituting net-shaped heating element 2 has low rigidity. Although metal wires 52 respectively helically wound onto elastic yarn 51 each have high rigidity, metal wires 52 follows extension and contraction of elastic yarn 51 with deformation of the shape of the helix thereof.

As illustrated in FIGS. 3A and 3B, when net-shaped heating element 2 is not heated, net-shaped heating element 2 is in contact with the outside surface of actuator wire 1.

Immediately after heat net-shaped heating element 2 is heated with controller 5, since net-shaped heating element 2 is in contact with the outside surface of actuator wire 1, heat generated due to heat generation of net-shaped heating element 2 is transmitted efficiently to actuator wire 1.

FIG. 3C is a simplified diagram of actuator 68 when actuator wire 1 is heated by net-shaped heating element 2. FIG. 3D is a cross-sectional view taken along line 3D-3D included in FIG. 3C. Actuator wire 1 is contracted due to application of heat of net-shaped heating element 2. At this time, a mesh of net-shaped heating element 2 follows extension of actuator wire 1 and deforms, without significant move from the outside surface of actuator wire 1. In this way, actuator wire 1 is allowed to be almost evenly heated. In case where a net-shaped heating element is composed of metal wires having high rigidity, the mesh of the net-shaped heating element fails to follow contraction of actuator wire 1. As a result, a part of metal wires constituting the net-shaped heating element may significantly move away from the outside surface of actuator wire 1. Thus, actuator wire 1 fails to be almost evenly heated. As a result, efficiency of the actuator device is lowered.

As illustrated in FIGS. 3C and 3D, heating wires 21a and 21b move away from the outside surface of actuator wire 1. As illustrated in FIG. 3C, net-shaped heating element 2 almost evenly expands to allow distances between heating wires 2 and actuator wire 1 illustrated in FIG. 3D to be almost even. Therefore, during release of the heat, temperature distributes almost evenly on actuator wire 1. In case where a net-shaped heating element is composed of metal wires having high rigidity, the mesh of the net-shaped heating element fails to expand almost evenly. Thus, when the net-shaped heating element is restored due to the release of the heat, the mesh would be likely to form an un-uniform shape.

As described above, since actuator wire 1 having the both ends joined to the both ends of tubular net-shaped heating element 2 is contracted, net-shaped heating element 2 moves away outward in such a manner that net-shaped heating element 2 is moved from the outside surface of actuator wire 1 in a direction perpendicular to the longitudinal direction of actuator 1 (i.e., outward in a radial direction relative to a central axis). In other words, while net-shaped heating element 2 is heated by application of electric power, net-shaped heating element 2 deforms in such a manner that net-shaped heating element 2 partially or entirely expands.

As described above, since net-shaped heating element 2 moves away from the outside surface of actuator wire 1 during heating, namely, net-shaped heating element 2 expands during the heating, net-shaped heating element 2 is not brought into contact with the outside surface of actuator wire 1.

As disclosed in Non-Patent Literature 1, when net-shaped heating element 2 is cooled, actuator wire 1 is restored. In other words, when net-shaped heating element 2 is cooled, actuator wire 1 extends in the longitudinal direction thereof and is restored so as to have its original shape. As a result, tubular net-shaped heating element 2 is brought into contact with the outside surface of actuator wire 1. Net-shaped heating element 2 may be naturally cooled under a room temperature. Alternatively, net-shaped heating element 2 may be cooled with a cooler such as a Peltier element. The above-described contraction and restoration may be repeated.

Tubular both ends of net-shaped heating element 2 are joined to the both ends of actuator wire 1 with first joint 4a and second joint 4b. It is desirable that first joint 4a and second joint 4b is formed of metal. The reason therefor is that heat generated at the both ends of net-shaped heating element 2 is released to air through first joint 4a and second joint 4b formed of metal.

(Application Example of Actuator Device 60)

An application example of actuator device 60 will be described.

FIG. 2D is a schematic diagram of a state where actuator device 60 including a plurality of actuators 68 has been attached to thigh 100h before heating. FIG. 2E is a schematic diagram of a state where actuator device 60 including the plurality of actuators 68 has been attached to thigh 100h after heating.

As illustrated in FIGS. 2D and 2E, as an example, actuator device 60 comprises the plurality of actuators 68, first fixture 150, and second fixture 160.

As first fixture 150 and second fixture 160, hook and loop fasteners may be used, for example. In this case, either of first fixture 150 and second fixture 160 has a hook surface having a large number of hook-shaped projections, while another of first fixture 150 and second fixture 160 has a loop surface having a large number of loop-shaped projections. When the hook surface is pushed onto the loop surface, the first fixture is fixed to the second fixture. A fixation location of the second fixture to the first fixture may be adjusted.

As illustrated in FIG. 2E, a force with which thigh 100h is tighten toward the inside of thigh 100h is generated due to application of heat.

(Characteristics of Actuator Device 60)

Two characteristics are required for actuator device 60. The first one is a ratio of an amount of work to input energy. The ratio is also referred to as efficiency. The input energy is a product of power and a time. The amount of work is a product of a load of weight 6, its pulled distance, and gravitational acceleration. It is preferable that efficiency of actuator device 60 is high. The second one is durability against repetitive operations. When an electric resistance value of heating wires 21 fluctuates, a heating value of heating wires 21 fluctuates. As a result, an amount of work on actuator device 60 fluctuates. Thus, it is preferable that fluctuation in electric resistance value during repetitive operations is small.

EXAMPLES

The present disclosure will be described in further detail with reference to examples.

Inventive Example 1

(Produce of Actuator Wire 1)

The present inventors provided coil-shaped polymer fibers according to the disclosure in Patent Literature 5. Next, as illustrated in FIG. 2A, the present inventors have twisted two coil-shaped polymer fibers to provide actuator wire 1. As described above, actuator wire 1 was composed of the two coil-shaped polymer fibers twisted together with each other. In other words, an outside surface of the one of twisted coil-shaped polymer fibers was in contact with an outside surface of the other of the twisted coil-shaped polymer fibers.

(Produce of Heating Wire 21)

A monofilament made of polyester (Purchased from Toray Industries, Inc., Fiber thickness: 15 deniers) was used as elastic yarn 51. A stainless steel wire (Purchased from Nippon Seisen Co., Ltd., Product name: stainless steel wire, Material: SUS 316L:, Diameter size: 0.030 mm) was used as metal wire 52. Metal wire 52 was S-twisted (Number of twists: 2950 T/m) around elastic yarn 51. As described above, the present inventors provided heating wire 21.

(Covering Actuator Wire 1 with Heating Wires 21)

The present inventors covered the outside surface of actuator wire 1 with four heating wires 21 using the braider illustrated in FIG. 5.

The present inventors cut actuator wire 1 covered with heating wires 21 to provide actuator 68 having a length of approximately 240 millimeters. In this way, the present inventors provided actuator 68 composed of actuator wire 1 and net-shaped heating element 2 covering the outside surface of actuator wire 1.

(Joining with Joint 4)

Figure 6A:
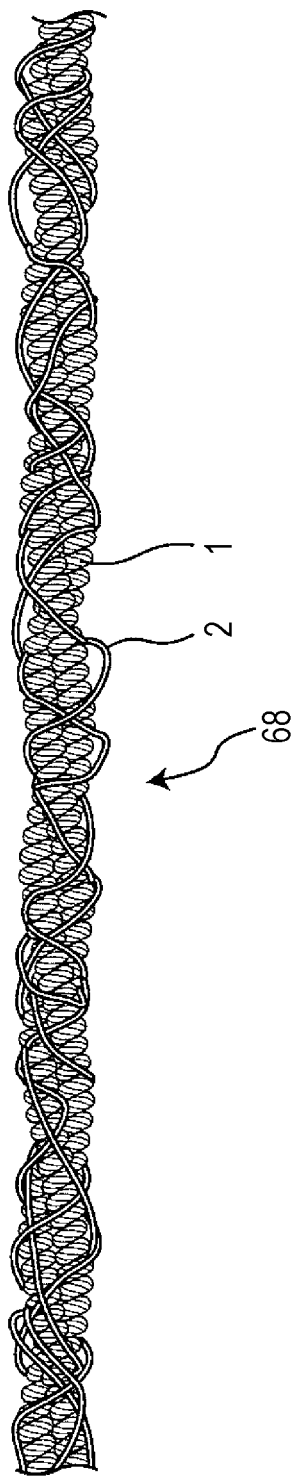
FIG. 6A is a schematic diagram of a state where actuator 68 according to Inventive Example 1 has contracted.
Figure 6B:
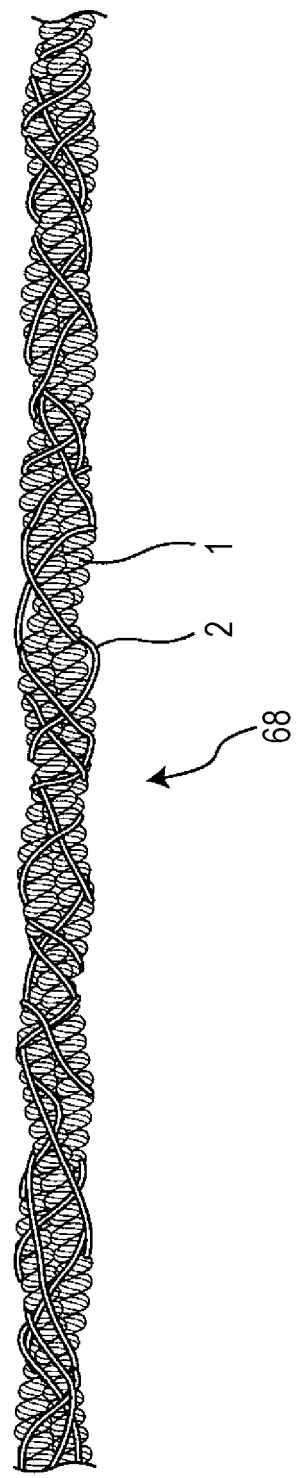
FIG. 6B is a schematic diagram of a state when actuator 68 according to Inventive Example 1 has extended.

The present inventors swaged both ends of actuator 68 with first joint 4a and second joint 4b made of metal. At this time, round-shaped spade connectors were used as first joint 4a and second joint 4b. In this way, the present inventors provided actuator 68. The present inventors observed that extension and contraction of actuator 68. FIG. 6A illustrates the state where actuator 68 has been contracted, whereas FIG. 6B illustrates the state where actuator 68 has been extended. In both cases, net-shaped heating element 2 had a uniform shape.

(Heating Test)

Figure 7A:
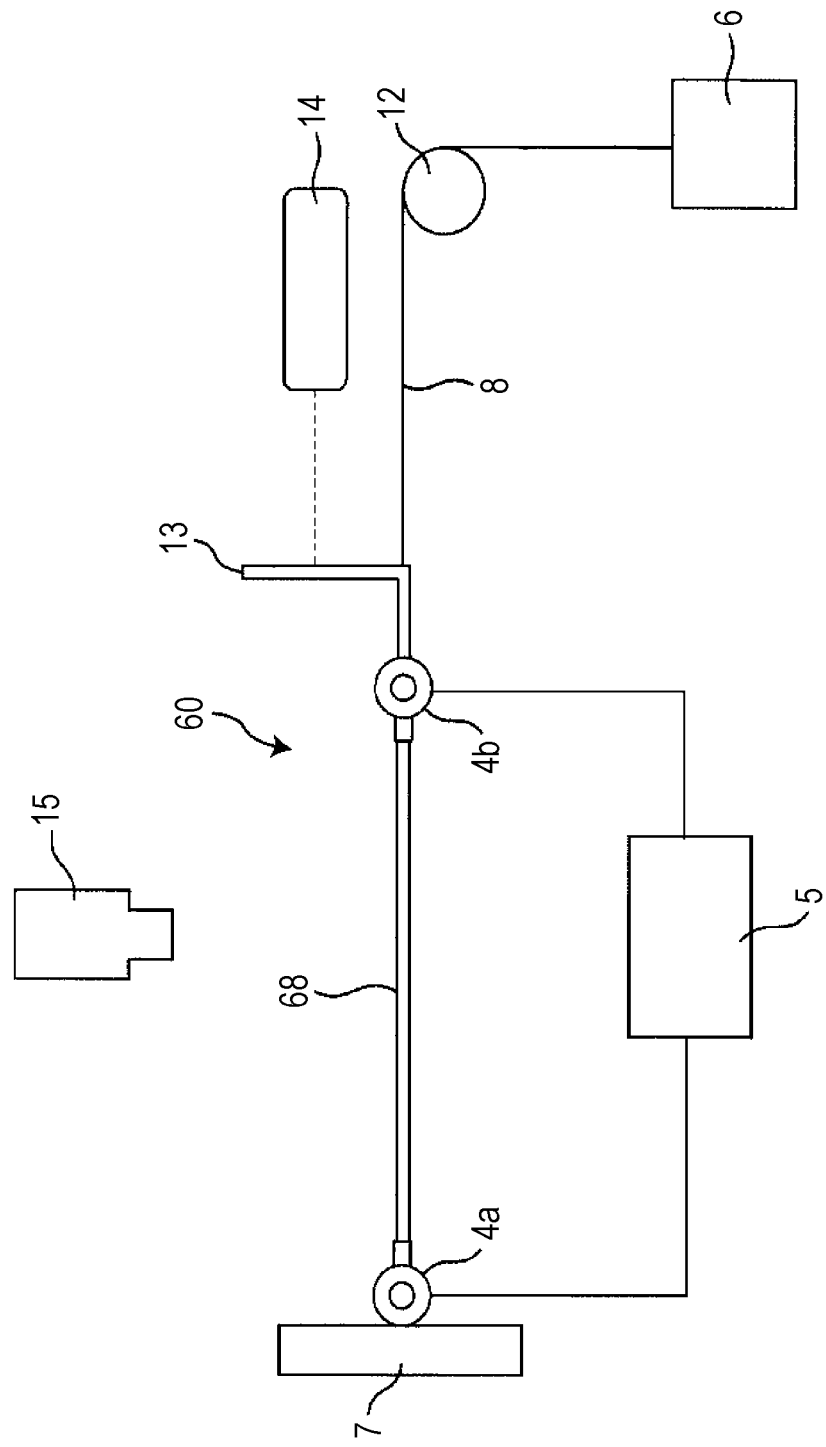
FIG. 7A is an outline diagram of a testing device used for a heating test.

A heating test for actuator 68 was conducted as described below. FIG. 7A is an outline diagram of a testing device used for the heating test. Stationary plate 7 was used to fix first joint 4a. Weight 6 of 0.070 kg was attached via wire 8 to second joint 4b. With weight 6, actuator wire 1 was made taut. An overall length of actuator 68 reached 47.5 mm. Herein, "the overall length of actuator 68" means the overall length of actuator 68 when a tensile force is applied to actuator wire 1 to make actuator wire 1 taut. Wire 8 was guided by pulley 12. Mirror 13 was further attached to second joint 4b. In this way, first joint 4a was fixed, whereas second joint 4b was disposed so as to be oscillatable in the longitudinal direction of actuator wire 1. Note that net-shaped heating element 2 is omitted in FIG. 7A.

As illustrated in FIG. 7A, the present inventors electrically connected first joint 4a and second joint 4b to controller 5. A current of 100 milliamperes and an electric power of 0.25 wattages were applied to net-shaped heating element 2 during a heating period of seven seconds with controller 5. An electric resistance value of net-shaped heating element 2 at this time was 33Ω. In this way, the outside surface of actuator wire 1 was heated. Input energy was 1.75 joules (=0.25 wattages×7 seconds). The power and the time were multiplied to calculate the input energy. Actuator wire 1 was contracted due to application of the heat in the longitudinal direction thereof. The contraction motion caused weight 6 of 0.070 kg to be pulled up 0.0033 m. An amount of work of actuator wire 1 at this time was 0.00226 joules (=0.070 kg×0.0033 m×9.8 m/s$^2$). The amount of work was calculated by multiplying the load of weight 6, the distance of pulling up weight 6, and the gravitational acceleration. As described above, efficiency of the actuator device according to Inventive Example 1 (i.e., 100×amount of work/input energy) was 0.129% (=100×0.00226 joules/1.75 joules). Next, during a cooling period of 50 seconds, no current flowed through net-shaped heating element 2. In this way, the outside surface of actuator wire 1 was naturally cooled under the room temperature.

Actuator wire 1 was extended and restored due to the release of the heat in the longitudinal direction thereof. As actuator wire 1 was extended and restored, mirror 13 was oscillated in the longitudinal direction of actuator wire 1. Oscillation of mirror 13 was measured with laser displacement meter 14 (Purchased from Keyence Corporation, Product name: LK-080). A temperature on the outside surface of actuator wire 1 was measured with radiation thermometer 15 (Purchased from Apiste Corporation, Product name: FSV-210).

Figure 7B:
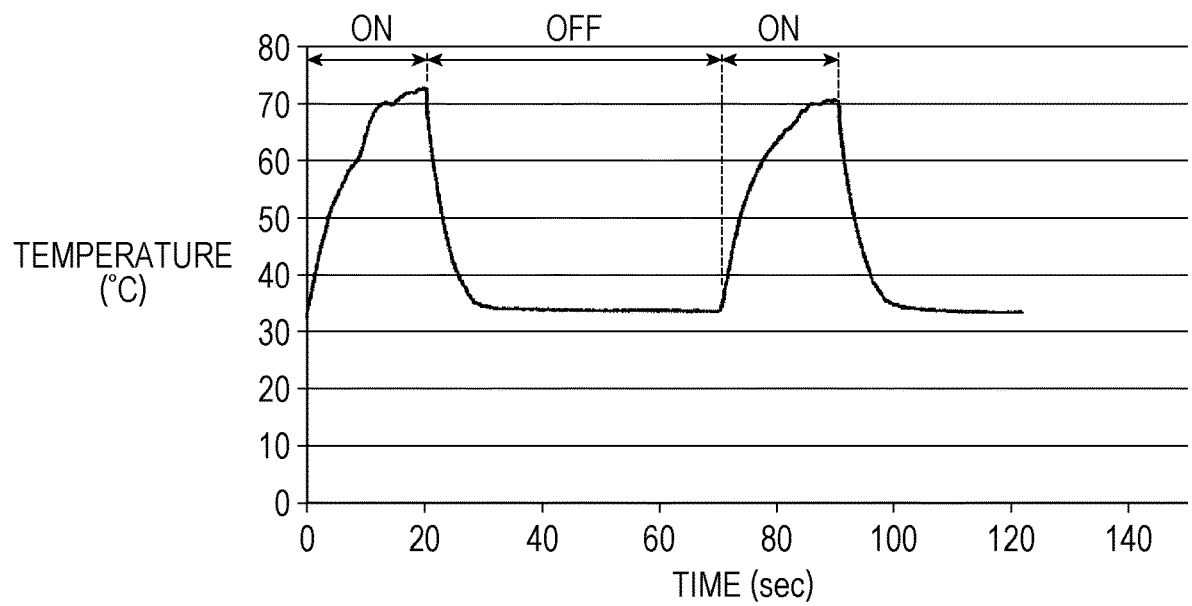
FIG. 7B is a graph illustrating the temperature of the outside surface of actuator wire 1 measured with radiation thermometer 15.

FIG. 7B is a graph illustrating the temperature of the outside surface of actuator wire 1 measured with radiation thermometer 15. As is clear from FIG. 7B, after the temperature of the outside surface of actuator wire 1 reached approximately 70 degrees Celsius, the temperature on the outside surface of actuator wire 1 started to be lowered. This means that net-shaped heating element 2 moved away from the outside surface of actuator wire 1. While the current was flowing through net-shaped heating element 2, the temperature of the outside surface of actuator wire 1 was kept within a range from approximately not less than 60 degrees Celsius and not more than approximately 70 degrees Celsius. While no current was flowing through net-shaped heating element 2, the temperature on the outside surface of actuator wire 1 was kept to approximately 35 degrees Celsius.

Figure 7C:
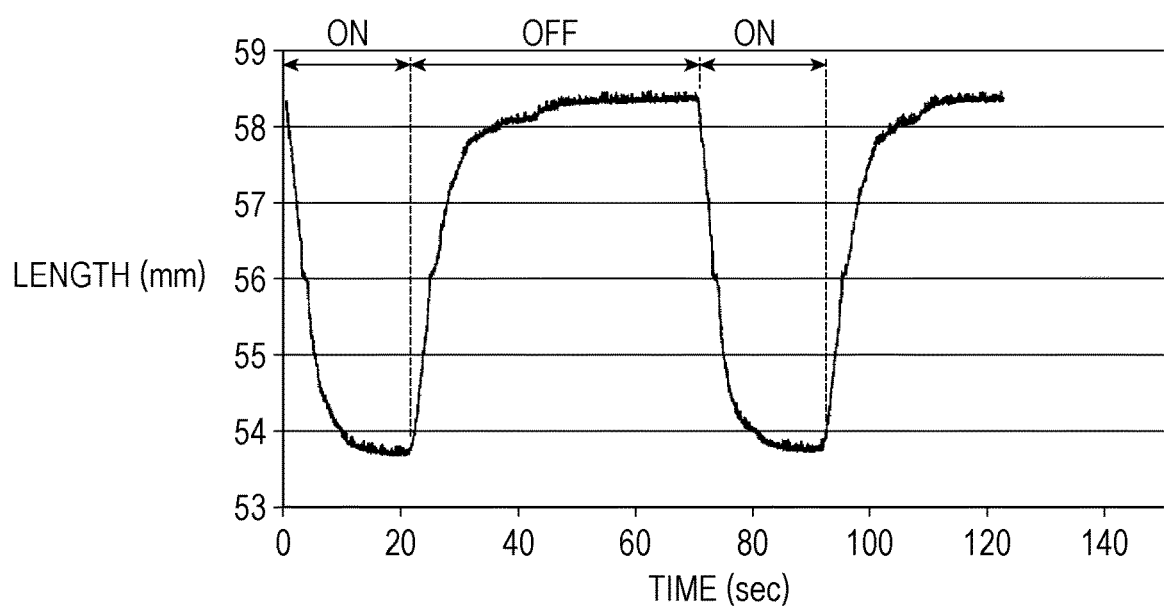
FIG. 7C is a graph illustrating a length of actuator wire 1 which was measured with laser displacement meter 14.

FIG. 7C is a graph of illustrating a length of actuator wire 1 measured with laser displacement meter 14. As is clear from FIG. 7C, while the current was flowing through net-shaped heating element 2, namely, actuator wire 1 was heated, actuator wire 1 shortened to a length of 53.7 millimeters. On the other hand, while actuator wire 1 was not heated, actuator wire 1 was restored to the original length of 58.3 millimeters.

Figure 8:
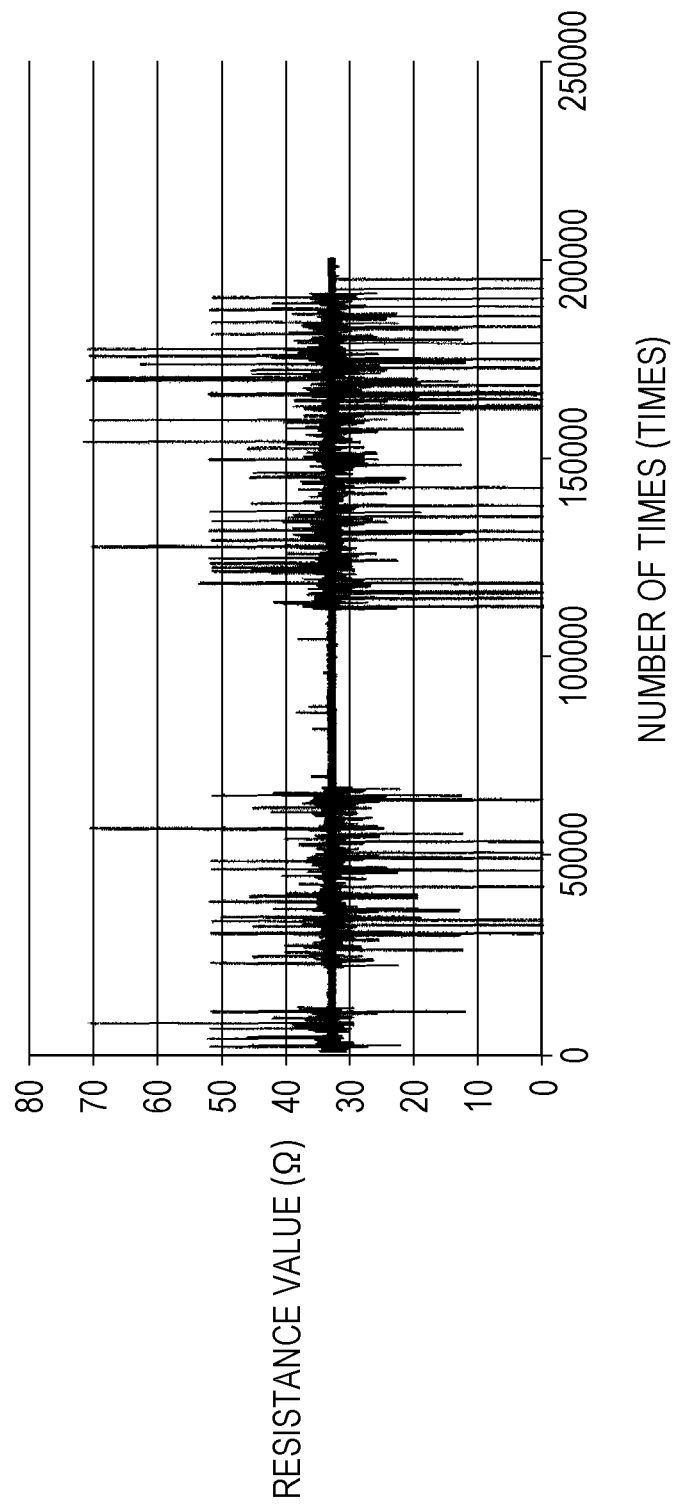
FIG. 8 is a graph illustrating changes in electric resistance value of net-shaped heating element 2 according to Inventive Example 1.

The heating and cooling were repeated two hundred thousand times. FIG. 8 illustrates changes in electric resistance value of net-shaped heating element 2 during this period. In FIG. 8, even some noises were seen during a plurality of measurements, an electric resistance value of net-shaped heating element 2 was not changed. The electric resistance value was 33Ω.

Inventive Example 2

In the inventive example 2, an experiment similar to the inventive example 1 was conducted, except that double-covering heating wires were used as heating wires 21. Spandex (Purchased from Toray Opelontex Co., Ltd., Product name: T-906C, 180 deniers) was used as first elastic yarn 51. A stainless steel wire (Purchased from Nippon Seisen Co., Ltd., Product name: stainless steel wire, Material: SUS 316L, Diameter size: 0.030 mm) was used as metal wire 52. A monofilament made of polyester (Purchased from THAI POLYESTER CO. LTD., Fiber thickness: 75 deniers) was used as the second elastic yarn. First, metal wire 52 was S-twisted (Number of twists: 844 T/m) around first elastic yarn 51. Next, the second elastic yarn was Z-twisted (Number of twists: 1006 T/m) around first elastic yarn 51 S-twisted with metal wire 52. As described above, the present inventors provided heating wire 21.

Actuator 68 had a length of 66 mm.

A current of 110 milliamperes and an electric power of 0.43 wattages were applied to net-shaped heating element 2 during a heating period of 7 seconds with controller 5. In this way, the outside surface of actuator wire 1 was heated. Input energy was 3.01 joules (=0.43 wattages×seven seconds). Actuator wire 1 was contracted due to application of the heat in the longitudinal direction thereof. The contraction motion caused weight 6 of 0.070 kg to be pulled up 0.0044 m. An amount of work was 0.00302 joules (=0.070 kg×0.0044 m×9.8 m/s$^2$). As described above, efficiency of actuator device 60 according to Inventive example 2 was 0.100% (=100×0.00302 joules/3.01 joules). The heating and cooling were repeated 1,000 times. In this period, the electric resistance value of net-shaped heating element 2 was not changed.

Comparative Example 1

In the comparative example 1, an experiment similar to the inventive example 1 was conducted, except that heating element 2 had not a net-shaped shape, but one heating wire was used. In other words, in the comparative example 1, as illustrated in FIG. 9A, the one heating wire was helically wounded onto the side surface of actuator wire 1. Silver-plated nylon yarn (Purchased from Mitsufuji Corporation, Product name: AGPoss, Fiber thickness: 30 deniers) was twisted to provide the heating wire. The heating wire had a number of twists of 250 T/m. An actuator according to the comparative example 1 had a length of approximately 240 millimeters.

As illustrated in FIG. 7A, the present inventors electrically connected first crimped terminal 4a and second crimped terminal 4b to controller 5. A current of 70 milliamperes flowed through net-shaped heating element 2 with controller 5.

FIG. 9B is a cross-sectional view taken along line 9B-9B included in FIG. 9A. In FIG. 9B, no current flows through heating wire 21. FIG. 9C is a cross-sectional view when a current flows through heating wire 21. As illustrated in FIG. 9B and FIG. 9C, regardless of presence or absence of a current flowing through heating wire 21, heating wire 21 is in contact with the side surface of actuator wire 1. As a result, after approximately 32 seconds elapsed from the starting of the application of heat, actuator wire 1 was broken.

Figure 10A:
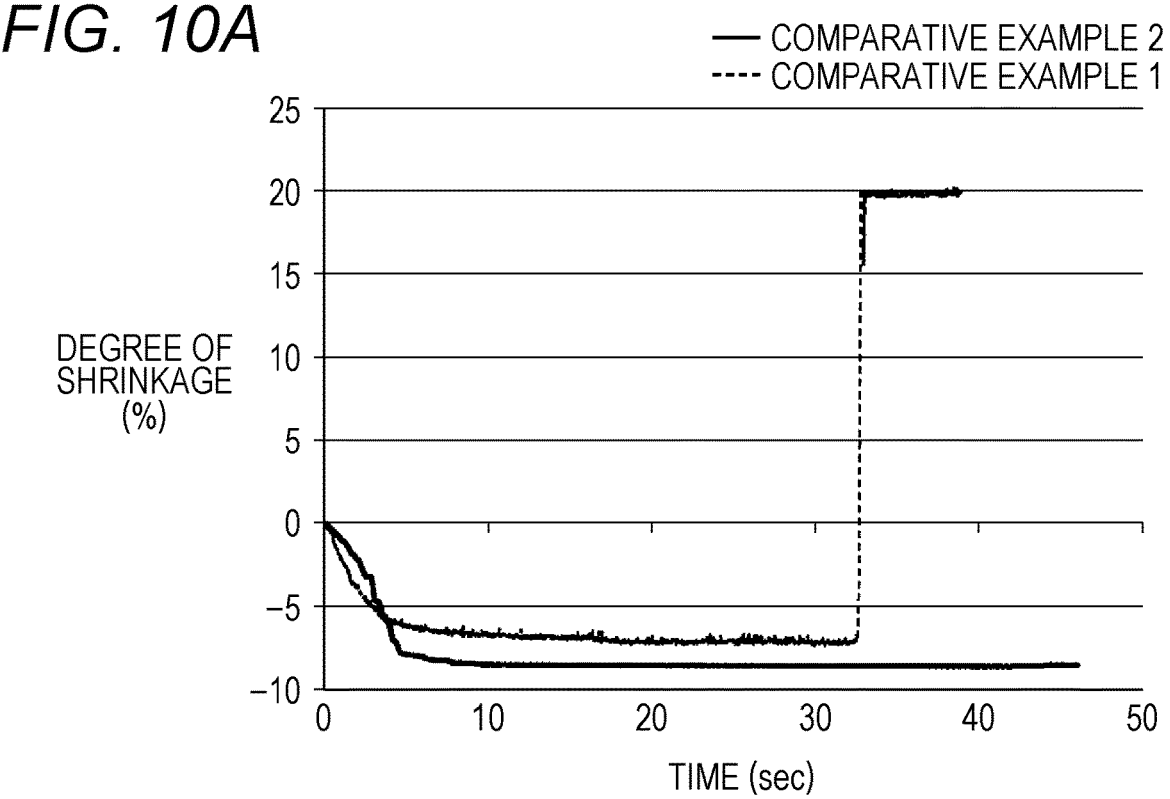
FIG. 10A is a graph illustrating ratio of expansion and contraction of actuator wires according to Comparative Examples 1 and 2.

FIG. 10A is a graph illustrating a ratio of expansion and contraction of actuator wire 1 according to the comparative example 1. For purpose of comparison, a ratio of expansion and contraction of actuator wire 1 according to the comparative example 2, which will be described later, is also illustrated. As is clear from FIG. 10A, even in the comparative examples 1 and 2, a ratio of expansion and contraction failed within a range of approximately −5% to approximately −10% after 30 seconds elapsed from the stating of the application of heat. In other words, actuator wire 1 was contracted within a range from 5% to 10%. In the comparative example 1, however, the ratio of expansion and contraction suddenly was increased to +20% after approximately 32 seconds elapsed from the application of the heat. This means that actuator wire 1 according to the comparative example 1 was broken.

Figure 10B:
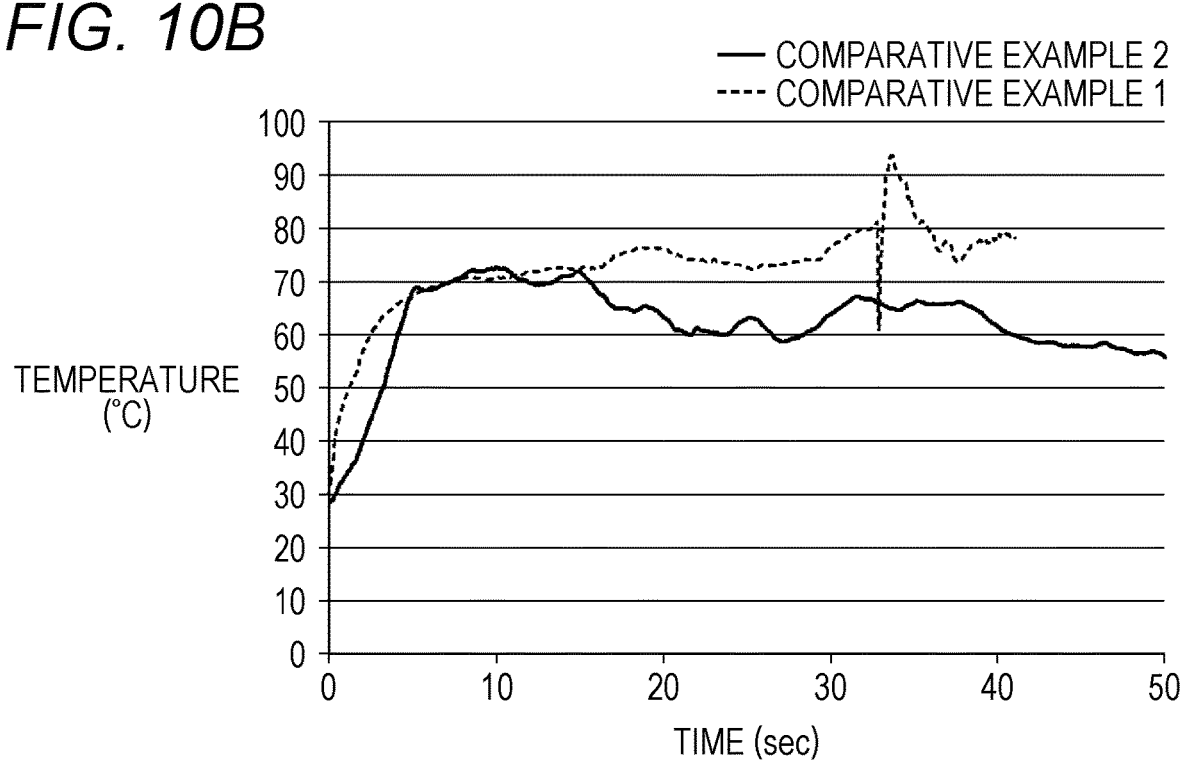
FIG. 10B is a graph illustrating surface temperatures of side surfaces of the actuator wires according to Comparative Examples 1 and 2.

FIG. 10B is a graph illustrating a surface temperature on the side surface of actuator wire 1 according to the comparative example 1. For purpose of comparison, a surface temperature of the side surface of actuator wire 1 according to the comparative example 2, which will be described later, is also illustrated. As is clear from FIG. 10B, in the comparative example 2, the surface temperature of the side surface of actuator wire 1 was always approximately 75 degrees Celsius or lower. On the other hand, in the comparative example 1, the temperature of the side surface of actuator wire 1 suddenly exceeded 90 degrees Celsius after approximately 32 seconds elapsed from the application of the heat. This means that actuator wire 1 according to the comparative example 1 was broken.

Comparative Example 2

In the comparative example 2, an experiment similar to the inventive example 1 were conducted, except that a wire (Number of twists: 250 T/m) provided by twisting a silver-plated nylon wire (Purchased from Mitsufuji Corporation, Product name: AGPoss, Fiber thickness: 30 deniers) was used as heating wire 21. The silver-plated nylon wire almost fully retained nylon's elasticity.

An actuator according to the comparative example 2 had a length of 35 mm.

A current of 75 milliamperes and an electric power of 0.19 wattages were applied to the net-shaped heating element during a heating period of 7 seconds with controller 5. An electric resistance value at this time was approximately 7.2Ω. In this way, the outside surface of actuator wire 1 was heated. Input energy was 1.33 joules (=0.19 wattages×seven seconds). Through heating, actuator wire 1 was contracted in the longitudinal direction thereof. The contraction motion caused weight 6 of 0.050 kg to be pulled up 0.0026 m. An amount of work was 0.00127 joules (=0.050 kg×0.0026 m×9.8 m/s$^2$). In other words, efficiency of the actuator device was 0.096% (=100×0.00127 joules/1.34 joules). The heating and cooling were repeated 500 times. An electric resistance value of the net-shaped heating element after 500 times was 8.3Ω. FIG. 10C illustrates changes in electric resistance value of the net-shaped heating element during this period. The electric resistance value first lowered to 6.7Ω, and then increased. A change in the electric resistance value from the minimum value to the maximum value was 23%.

Comparative Example 3

In the comparative example 3, an experiment similar to the inventive example 1 were conducted, except that stainless steel wires (Purchased from Nippon Seisen Co., Ltd., Product name: stainless steel wire, Material: SUS 316L, Diameter size: 0.050 mm) were used as heating wires 21. Each of the stainless steel wires has tensile strength of 900 (N/mm$^2$) and a cross-sectional area of 0.002 (mm$^2$). In other words, a product of the tensile strength and the cross-sectional area was 1.80 (N).

An actuator according to the comparative example 3 had a length of 28 mm. The state of extension and contraction of the actuator was observed. FIG. 11A illustrates the state where the actuator was contracted. FIG. 11B illustrates the state where the actuator was extended. As illustrated in region 50 in FIG. 11A, in the state where the actuator was contracted, a part of heating wires constituting the net-shaped heating element significantly moved away from the outside surface of actuator wire 1.

A current of 230 milliamperes and a power of 0.276 wattages were applied to the net-shaped heating element during a heating period of 7 seconds with controller 5. In this way, the outside surface of actuator wire 1 was heated. Input energy was 1.932 joules (=0.276 wattages×seven seconds). Actuator wire 1 was contracted in the longitudinal direction thereof due to the application of heat. The contraction motion caused weight 6 of 0.050 kg to be pulled up 0.0030 m. An amount of work was 0.00147 joules (=0.050 kg×0.0030 m×9.8 m/s$^2$). That is, efficiency of the actuator device was 0.076% (=100×0.00147 joules/1.932 joules).

Table 1 illustrates results of the experiments in the inventive examples 1 and 2 and the comparative examples 2 and 3.

TABLE 1

| | Shape of heating wire | 2 | Floating | Change in electric resistance value | Efficiency |
|---|---|---|---|---|---|
| Inventive Example 1 | Single-covering | Possible | None | None (two hundred thousand times) | 0.130 |
| Inventive Example 2 | Double-covering | Possible | None | None (1000 times) | 0.100 |
| Comparative Example 2 | Metal-plated single wire | Possible | None | Increase of 23% (500 times) | 0.096 |

TABLE 1-continued

| | Shape of heating wire | 2 | Floating | Change in electric resistance value | Efficiency |
|---|---|---|---|---|---|
| Comparative Example 3 | Metal single wire | Possible | Present | Not measured | 0.076 |

In the actuator device according to the comparative example 2, the electric resistance value had changed in the net-shaped heating element. The reason therefor would be that the plated metal peeled from the elastic yarn due to a difference in thermal expansion coefficient between the plated metal and the elastic yarn. In the actuator device according to the comparative example 2, a heating value would fluctuate in the net-shaped heating element, and therefore, an amount of extension and contraction of actuator wire 1 would be unstable in repetitive operations of heating and cooling in actuator wire 1.

On the other hand, in the actuator devices according to the inventive examples 1 and 2, the electric resistance value of net-shaped heating element 2 was not changed. Thus, in the actuator devices according to the inventive examples 1 and 2, an amount of contraction in actuator wire 1 would be allowed to be constant.

The actuator according to the comparative example 3 was not subjected to the repetitive operation test of heating and cooling. As long as stainless steel wires constituting the net-shaped heating element is not broken or worn due to the extension and the contraction of the actuator, the electric resistance value of the net-shaped heating element would not change substantially. As illustrated in Table 1, efficiency of the actuator devices according to the inventive examples 1 and 2 was higher than efficiency of the actuator devices according to the comparative examples 2 and 3. Therefore, the actuator devices according to the inventive examples 1 and 2 are preferable in terms of low consumption power.

INDUSTRIAL APPLICABILITY

The actuator devices according to the present disclosure can be used as artificial muscles.

REFERENCE SIGNS LIST 1 actuator wire
2 heating element
4 joint
4a first joint
4b second joint
5 controller
6 weight
7 stationary plate
8 wire
13 mirror
14 laser displacement meter
15 radiation thermometer
21 heating wire
22 pulley
23 mirror
50 region
51 elastic yarn
52 metal wire
53 second elastic yarn
60 actuator device
68 actuator
100h thigh
101 bobbin
102 pulley
103 winding device
105a to 105d bobbin
106a to 106d spindle
107a to 107d circular disk
109 braider
110 substrate
111a to 111h bobbin
112a to 112h circular disk
113 braid
114 guide roll
150 first fixture
160 second fixture

The invention claimed is:

1. An actuator device comprising:
an actuator wire;
a net-shaped heating element which covers a side surface of the actuator wire and comprises heating wires; and
a controller for supplying electric power to the net-shaped heating element to heat the net-shaped heating element, wherein
the actuator wire is contracted by application of heat and restored by release of the heat;
the side surface of the actuator wire is formed of a polymer;
one end of the net-shaped heating element is connected to an end of the actuator wire;
another end of the net-shaped heating element is connected to another end of the actuator wire,
each of the heating wires comprises an insulative first elastic yarn and a metal wire;
the metal wire are helically wound onto the first elastic yarn;
when the net-shaped heating element is not heated, the net-shaped heating element is in contact with the side surface of the actuator wire; and
when the net-shaped heating element is heated, the net-shaped heating element moves outward from the side surface of the actuator wire due to contraction of the actuator wire.

2. The actuator device according to claim 1, wherein
each of the heating wires further comprises an insulative second elastic yarn;
the metal wire is S-twisted;
the second elastic yarn is wound helically onto the first elastic yarn around which the metal wire has been helically; and
the second elastic yarn is Z-twisted.

3. The actuator device according to claim 1, wherein
each of the heating wires comprises an insulative second elastic yarn;
the metal wire is Z-twisted;
the second elastic yarn is helically wound onto the first elastic yarn around which the metal wires has been helically; and
the second elastic yarn is S-twisted.

4. The actuator device according to claim 1, wherein
each of the heating wires is helically wound onto the side surface of the actuator wire; and
the heating wires are braided to form the net-shaped heating element.

5. The actuator device according to claim 1, wherein
the heating wires are S-twisted.

6. The actuator device according to claim 1, wherein the heating wires are Z-twisted.

7. The actuator device according to claim 1, wherein
each of the heating wires has a shape of a rectangular wave; and
the wires each having the rectangular wave shapes are knitted to form the net-shaped heating element.

8. The actuator device according to claim 1, wherein
the heating wires are helically wound onto the side surface of the actuator wire; and
the heating wires are woven to form the net-shaped heating element.

9. The actuator device according to claim 1, wherein
the actuator wire is formed of a fiber;
the fiber is twisted around a longitudinal axis thereof;
the fiber is folded so as to have a shape of cylindrical coil;
the fiber is formed of linear low-density polyethylene; and
the following mathematical formula is satisfied:

$$D/d<1 \qquad (I)$$

where
D represents an mean diameter of the cylindrical coil; and
d represents a diameter of the fiber.

10. The actuator device according to claim 1, wherein
a product of tensile strength of the metal wire and a cross-sectional area of the metal wire is more than 0.27 N and not more than 0.63 N.

11. An actuator comprising:
an actuator wire; and
a net-shaped heating element which covers a side surface of the actuator wire and comprises heating wires;
wherein
the actuator wire is contracted by application of heat and restored by release of the heat;
the side surface of the actuator wire is formed of a polymer,
each of the heating wires comprises insulative first elastic yarn and a metal wire, and
the metal wire is wound helically onto the first elastic yarn.

12. The actuator according to claim 11, wherein
an end of the net-shaped heating element is connected to an end of the actuator wire,
another end of the net-shaped heating element is connected to another end of the actuator wire, and a part of the first elastic yarn is exposed to outside.

13. The actuator according to claim 11, further comprising:
a first joint and a second joint,
wherein
an end of the net-shaped heating element is connected to an end of the actuator wire with the first joint, and
another end of the net-shaped heating element is connected to another end of the actuator wire with the second joint.

14. The actuator according to claim 11, wherein
each of the heating wires further comprises an insulative second elastic yarn;
the metal wire is S-twisted;
the second elastic yarn is helically wound onto the first elastic yarn around which the metal wire has been wound; and
the second elastic yarn is Z-twisted.

15. The actuator according to claim 11, wherein
each of the heating wires further comprises an insulative second elastic yarn;
the metal wire is Z-twisted;
the second elastic yarn is helically wound onto the first elastic yarn around which the metal wire has been wound; and
the second elastic yarn is S-twisted.

16. The actuator according to claim 11, wherein
each of the heating wires is helically wound onto the side surface of the actuator wire; and
the heating wires are braided to form the net-shaped heating element.

17. The actuator according to claim 11, wherein the heating wires are S-twisted.

18. The actuator according to claim 11, wherein the heating wires are Z-twisted.

19. The actuator according to claim 11, wherein
each of the heating wires has a shape of a rectangular wave, and
the wires each having the rectangular wave shapes are knitted to form the net-shaped heating element.

20. The actuator according to claim 11, wherein
the heating wires are helically wound onto the side surface of the actuator wire, and
the heating wires are woven to form the net-shaped heating element.

21. The actuator according to claim 11, wherein
the actuator wire is formed of a fiber;
the fiber is twisted around a longitudinal axis thereof;
the fiber is folded so as to have a shape of cylindrical coil;
the fiber is formed of linear low-density polyethylene; and
the following mathematical formula is satisfied:

$$D/d<1 \qquad (I)$$

where
D represents an mean diameter of the cylindrical coil; and
d represents a diameter of the fiber.

22. The actuator according to claim 11, wherein
a product of tensile strength of the metal wire and a cross-sectional area of the metal wire is more than 0.27 N and not more than 0.63 N.

* * * * *